US012652614B2

(12) United States Patent
Lai et al.

(10) Patent No.: US 12,652,614 B2
(45) Date of Patent: Jun. 9, 2026

(54) CONGESTION CONTROL BACKOFF TIMER HANDLING FOR HOSTING NETWORK

(71) Applicant: MEDIATEK INC., Hsin-Chu (TW)

(72) Inventors: Chia-Lin Lai, Hsin-Chu (TW);
Yuan-Chieh Lin, Hsin-Chu (TW)

(73) Assignee: MediaTek Inc., Hsinchu City (TW)

( * ) Notice: Subject to any disclaimer, the term of this patent is extended or adjusted under 35 U.S.C. 154(b) by 324 days.

(21) Appl. No.: 18/133,999

(22) Filed: Apr. 12, 2023

(65) Prior Publication Data

US 2023/0354182 A1     Nov. 2, 2023

Related U.S. Application Data

(60) Provisional application No. 63/336,376, filed on Apr. 29, 2022.

(51) Int. Cl.
H04W 48/18 (2009.01)
H04W 48/16 (2009.01)
H04W 60/00 (2009.01)

(52) U.S. Cl.
CPC .......... H04W 48/18 (2013.01); H04W 48/16 (2013.01); H04W 60/00 (2013.01)

(58) Field of Classification Search
CPC ..... H04W 48/18; H04W 48/16; H04W 60/00; H04W 48/02
See application file for complete search history.

(56) References Cited

U.S. PATENT DOCUMENTS

| | | | | |
|---|---|---|---|---|
| 2013/0107863 A1* | 5/2013 | Faccin | ................ | H04W 28/082 |
| | | | | 370/331 |
| 2014/0328265 A1* | 11/2014 | Sampath | ............ | H04W 72/541 |
| | | | | 370/329 |
| 2017/0048880 A1* | 2/2017 | Anderson | ............. | H04W 72/54 |
| 2018/0368047 A1* | 12/2018 | Patil | ...................... | H04L 45/245 |
| 2019/0053139 A1* | 2/2019 | Basu Mallick | ....... | H04W 76/27 |
| 2021/0051577 A1* | 2/2021 | Won | ...................... | H04W 48/16 |
| 2021/0099924 A1* | 4/2021 | Shih | ...................... | H04W 48/18 |

(Continued)

OTHER PUBLICATIONS

Taiwan Intellectual Property Office Action 112115428, dated Nov. 23, 2023 (6 pages).

(Continued)

*Primary Examiner* — William G Trost, IV
(74) *Attorney, Agent, or Firm* — Helen Mao; Zheng Jin; Imperium Patent Works

(57)     ABSTRACT

A method of backoff timer handling for accessing a hosting network for localized services is proposed. When a UE receives a NAS message from an NPN hosting network with a backoff timer, the UE needs to determine whether it can register to the NPN as a hosting network for localized services while the backoff timer is running. The UE checks the validity information associated with the NPN, e.g., an SNPN/GIN/CAG, and determines whether the UE is still authorized to access the NPN upon/after backoff timer expiry. In one example, if the current time+the remaining length/duration of the backoff timer is longer than the end of the validity time of the NPN, then the UE triggers the network selection (SNPN selection or PLMN selection) and registers to another PLMN, PNI-NPN/CAG or SNPN for access for localized services, or just for normal services (non-localized services).

20 Claims, 16 Drawing Sheets

(56)                    References Cited

U.S. PATENT DOCUMENTS

| | | | | |
|---|---|---|---|---|
| 2021/0289404 | A1 | 9/2021 | Tseng | |
| 2021/0345226 | A1 | 11/2021 | Liao | |
| 2021/0368435 | A1 | 11/2021 | Koshta | |
| 2021/0377850 | A1 | 12/2021 | Shih | |
| 2022/0046530 | A1 | 2/2022 | Lai | |
| 2022/0053600 | A1 | 2/2022 | Ganig | |
| 2022/0225093 | A1 | 7/2022 | Sasi | |
| 2022/0279378 | A1* | 9/2022 | Kawasaki | H04W 76/20 |
| 2022/0312296 | A1* | 9/2022 | Chun | H04W 48/02 |
| 2023/0189191 | A1* | 6/2023 | Wang | H04W 36/00226 |
| | | | | 370/329 |
| 2023/0217401 | A1 | 7/2023 | Tiwari | |
| 2023/0247543 | A1 | 8/2023 | Kuge | |
| 2024/0187981 | A1 | 6/2024 | Rajendran | |
| 2024/0284320 | A1 | 8/2024 | Foti | |
| 2025/0016665 | A1 | 1/2025 | Chun | |
| 2025/0031169 | A1 | 1/2025 | Sethi | |
| 2025/0175891 | A1 | 5/2025 | Velev | |

OTHER PUBLICATIONS

3rd Generation Partnership Project; Technical Specification Group Services and System Aspects; System architecture for the 5G System (5GS); Stage 2 (Release 17), 3GPP TS 23.501 V17.4.0 (Mar. 2022), Mar. 23, 2022. https://www.3gpp.org/ftp/Specs/archive/23_series/231.501/23501-h40.zip Chapter 5.30.2.3. 5.30.2.4.2. 5.30.3 5.30.3.4.

USPTO Office Action U.S. Appl. No. 18/133,987 Dated Oct. 2, 2025.

USPTO Action U.S. Appl. No. 18/133,987 Dated Jun. 17, 2025.

3GPP TS 23.122 V17.6.0 (Mar. 2022); 3rd Generation Partnership Project; Technical Specification Group Core Network and Terminals; Non-Access-Stratum (NAS) functions related to Mobile Station (MS)in idle mode (Release 17) Year: 2022).

USPTO Office Action U.S. Appl. No. 18/133,987 Dated Jan. 12, 2026.

* cited by examiner

Broadcasts:                                    410
- SNPN IDs
  - SNPN 1 (SNPN ID == PLMN ID + NID)
  - SNPN 2 (SNPN ID == PLMN ID + NID)
  - ...
- GINs
  - GIN 1
  - GIN 2
  - ...
- HRNN
- indication per SNPN of
  - whether access using credentials from a Credentials Holder is supported
  - whether the SNPN allows registration attempts from UEs that are not explicitly configured to select the SNPN

401

NG-RAN

"list of subscriber data"

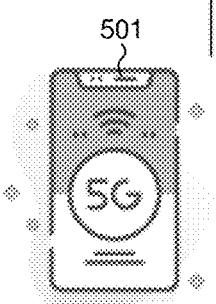

501

Entry 1 {                                                                    510
Subscribed SNPN ID: SNPN 1
Credentials
SNPN Selection Information/Configuration  {
- User controlled prioritized list of preferred SNPNs {
        SNPN 111;
        SNPN 112;
        ...
    }
- Credentials Holder controlled prioritized list of preferred SNPNs{
        SNPN 121;
        SNPN 122;
        ...
    }
- Credentials Holder controlled prioritized list of GINs{
        GIN 131;
        GIN 132;
        ...
    }
}
                                            SNPN subscription
}                                      (subscribed SNPN == SNPN 1)

Entry 2 {                                                                    520

Subscribed SNPN ID: SNPN 2

Credentials
SNPN Selection Information/Configuration  {
- User controlled prioritized list of preferred SNPNs {
        SNPN 211;
        SNPN 212;
        ...
    }
- Credentials Holder controlled prioritized list of preferred SNPNs{
        SNPN 221;
        SNPN 222;
        ...
    }
- Credentials Holder controlled prioritized list of GINs{
        GIN 231;
        GIN 232;
        ...
    }
}
                                            SNPN subscription
}                                      (subscribed SNPN == SNPN 2)
}

FIG. 5A

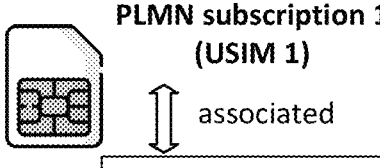

PLMN subscription 1
(USIM 1)

associated

SNPN Selection Information/Configuration  {                                    <u>530</u>
      ● User controlled prioritized list of preferred SNPNs {
          SNPN 311;
          SNPN 312;
          ...
      }
      ● Credentials Holder controlled prioritized list of preferred SNPNs{
          SNPN 321;
          SNPN 322;
          ...
      }
      ● Credentials Holder controlled prioritized list of GINs{
          GIN 331;
          GIN 332;
          ...
      }
}

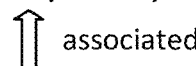

PLMN subscription 2
(USIM 2)

associated

SNPN Selection Information/Configuration  {                                    <u>540</u>
      ● User controlled prioritized list of preferred SNPNs {
          SNPN 411;
          SNPN 412;
          ...
      }
      ● Credentials Holder controlled prioritized list of preferred SNPNs{
          SNPN 421;
          SNPN 422;
          ...
      }
      ● Credentials Holder controlled prioritized list of GINs{
          GIN 431;
          GIN 432;
          ...
      }
}

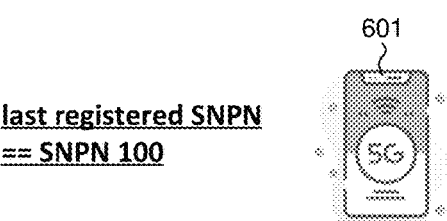

last registered SNPN
== SNPN 100

Entry 1 of "list of subscriber data" {
 Subscribed SNPN ID: SNPN 1
 Credentials
 SNPN Selection Information/Configuration {
  • User controlled prioritized list of preferred
   SNPNs {
     SNPN 111;
     SNPN 112;
     ...
  }
  • Credentials Holder controlled prioritized list
   of preferred SNPNs{
     SNPN 121;
     SNPN 122;
     ...
  }
  • Credentials Holder controlled prioritized list
   of GINs{
     GIN 131;
     GIN 132;
     ...
  }
 }
}

NETWORK
SELECTION

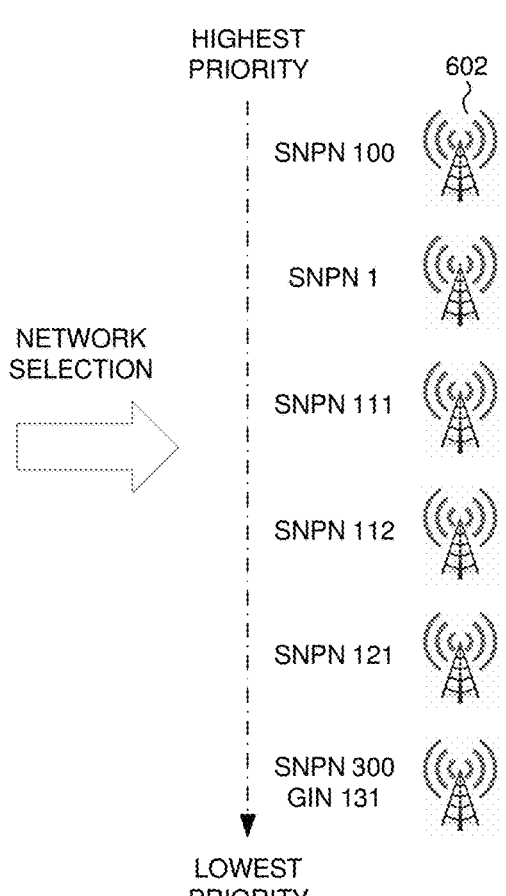

HIGHEST
PRIORITY                    602

SNPN 100

SNPN 1

SNPN 111

SNPN 112

SNPN 121

SNPN 300
GIN 131

LOWEST
PRIORITY

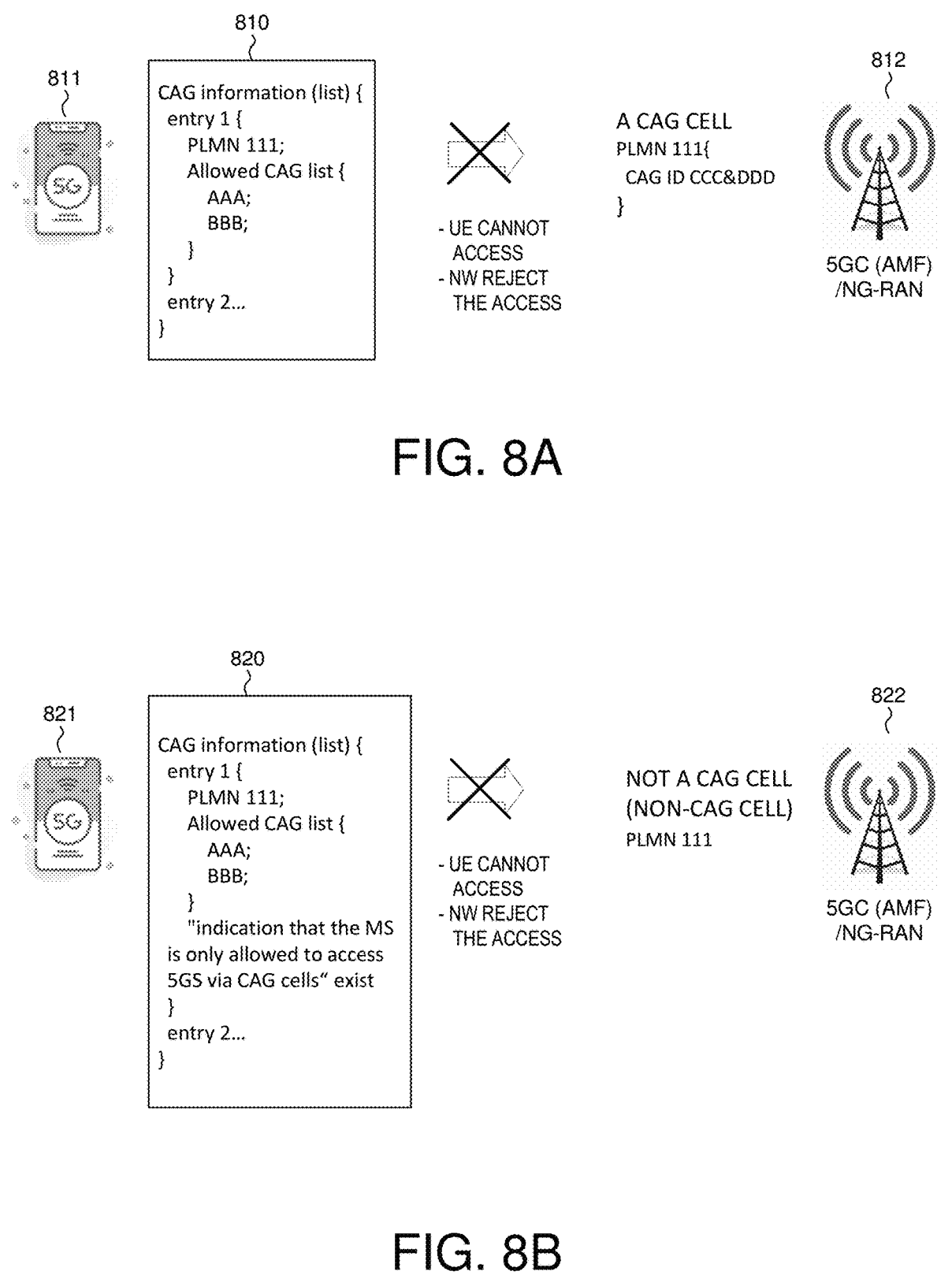

CAG information (list) {
  entry 1 {
    PLMN 111;
    Allowed CAG list {
      AAA;
      BBB;
    }
  }
  entry 2...
}

- UE CANNOT
  ACCESS
- NW REJECT
  THE ACCESS

A CAG CELL
PLMN 111{
  CAG ID CCC&DDD
}

812

5GC (AMF)
/NG-RAN

CAG information (list) {
  entry 1 {
    PLMN 111;
    Allowed CAG list {
      AAA;
      BBB;
    }
    "indication that the MS
is only allowed to access
5GS via CAG cells" exist
  }
  entry 2...
}

- UE CANNOT
  ACCESS
- NW REJECT
  THE ACCESS

NOT A CAG CELL
(NON-CAG CELL)
PLMN 111

822

5GC (AMF)
/NG-RAN

FIG. 8B

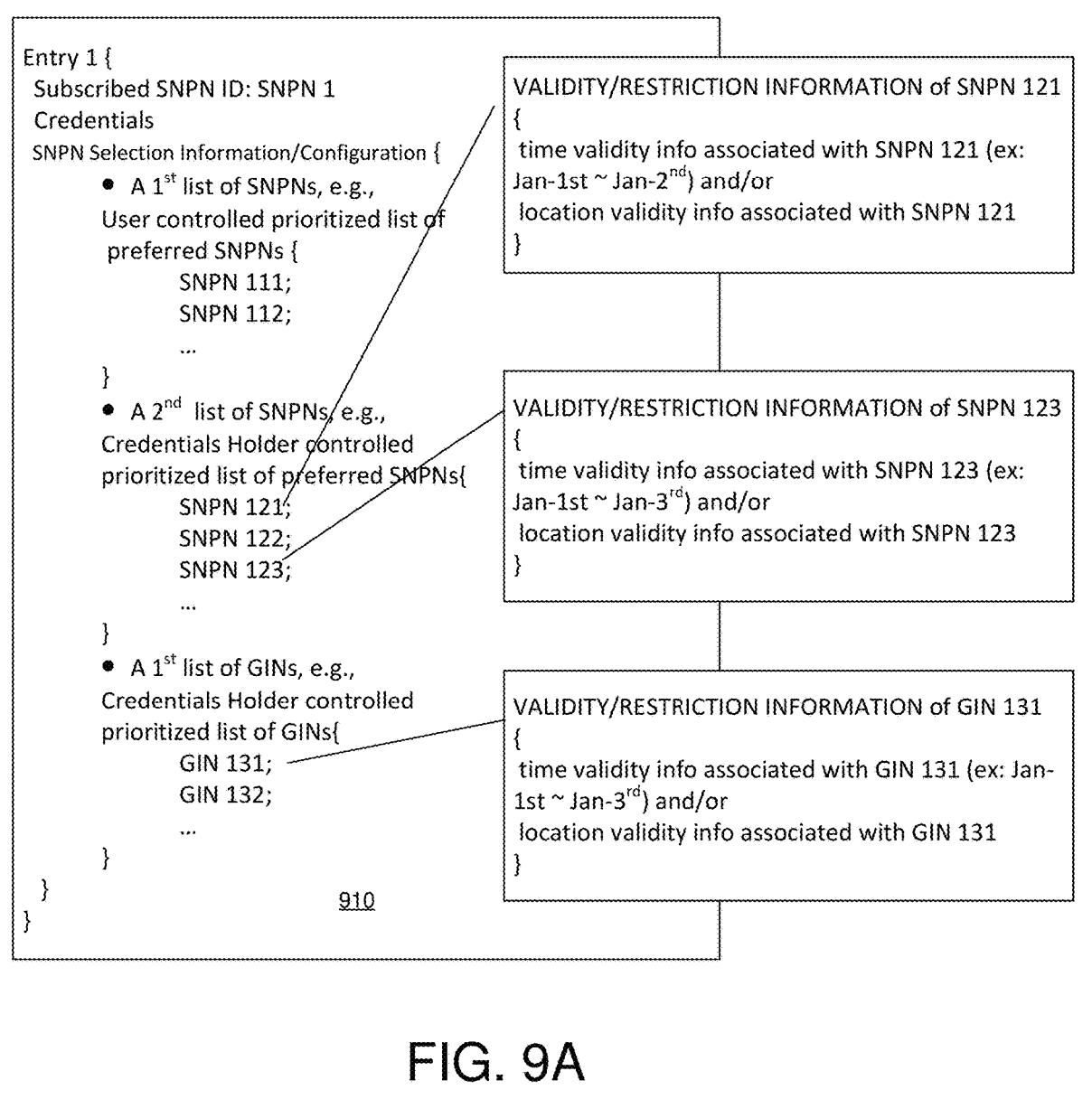

Entry 1 {
 Subscribed SNPN ID: SNPN 1
 Credentials
 SNPN Selection Information/Configuration {
  ● A 1$^{st}$ list of SNPNs, e.g.,
  User controlled prioritized list of
  preferred SNPNs {
    SNPN 111;
    SNPN 112;

...

}
  ● A 2$^{nd}$ list of SNPNs, e.g.,
  Credentials Holder controlled
  prioritized list of preferred SNPNs{
    SNPN 121;
    SNPN 122;
    SNPN 123;

...

}
  ● A 1$^{st}$ list of GINs, e.g.,
  Credentials Holder controlled
  prioritized list of GINs{
    GIN 131;
    GIN 132;

...

}
 }                        910
}

VALIDITY/RESTRICTION INFORMATION of SNPN 121
{
 time validity info associated with SNPN 121 (ex:
 Jan-1st ~ Jan-2$^{nd}$) and/or
 location validity info associated with SNPN 121
}

VALIDITY/RESTRICTION INFORMATION of SNPN 123
{
 time validity info associated with SNPN 123 (ex:
 Jan-1st ~ Jan-3$^{rd}$) and/or
 location validity info associated with SNPN 123
}

VALIDITY/RESTRICTION INFORMATION of GIN 131
{
 time validity info associated with GIN 131 (ex: Jan-
 1st ~ Jan-3$^{rd}$) and/or
 location validity info associated with GIN 131
}

FIG. 9A

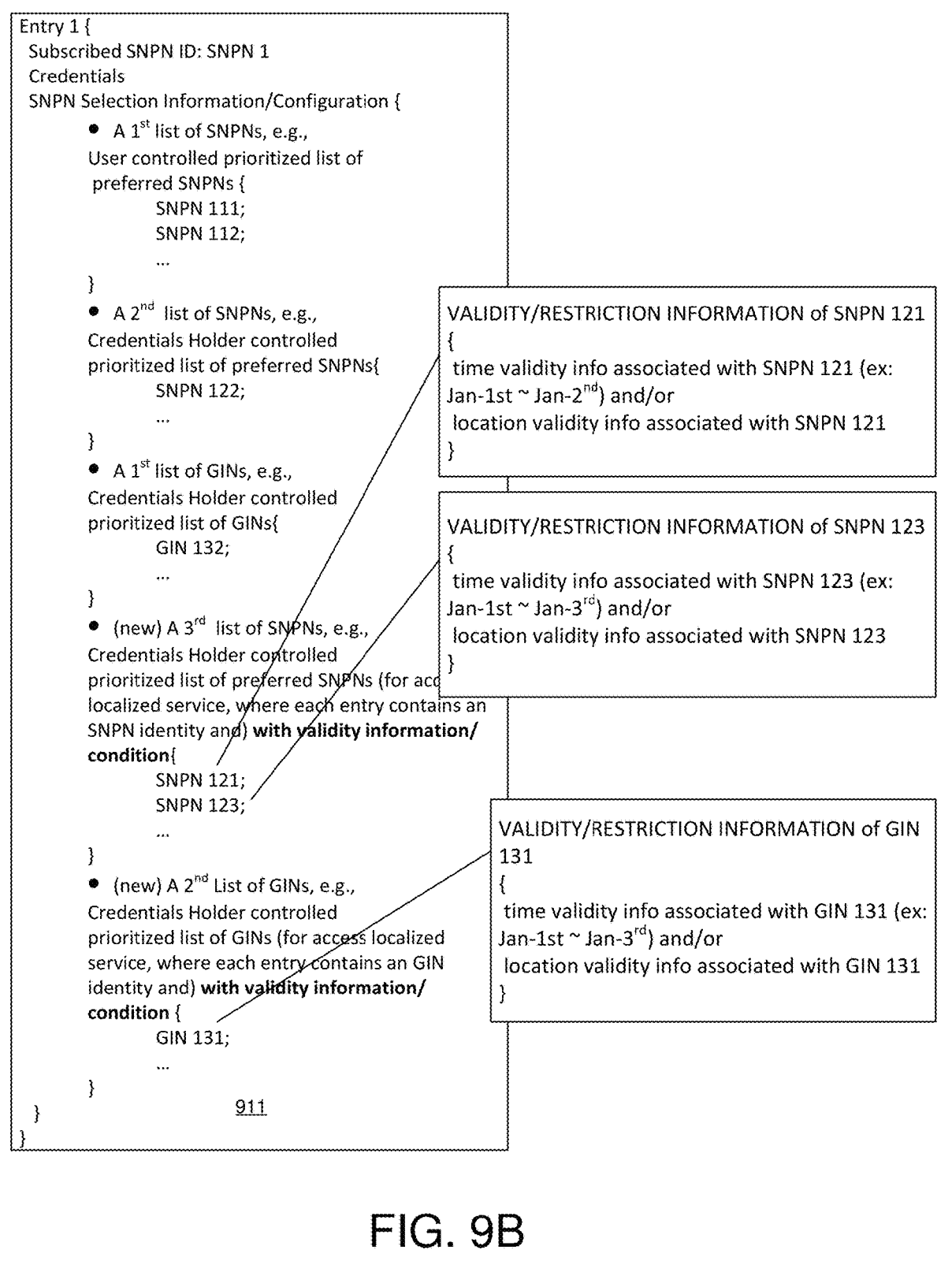

```
Entry 1 {
  Subscribed SNPN ID: SNPN 1
  Credentials
  SNPN Selection Information/Configuration {
          • A 1st list of SNPNs, e.g.,
          User controlled prioritized list of
          preferred SNPNs {
                  SNPN 111;
                  SNPN 112;

...
          }
          • A 2nd list of SNPNs, e.g.,
          Credentials Holder controlled
          prioritized list of preferred SNPNs{
                  SNPN 122;

...
          }
          • A 1st list of GINs, e.g.,
          Credentials Holder controlled
          prioritized list of GINs{
                  GIN 132;

...
          }
          • (new) A 3rd list of SNPNs, e.g.,
          Credentials Holder controlled
          prioritized list of preferred SNPNs (for acc
          localized service, where each entry contains an
          SNPN identity and) with validity information/
          condition{
                  SNPN 121;
                  SNPN 123;

...
          }
          • (new) A 2nd List of GINs, e.g.,
          Credentials Holder controlled
          prioritized list of GINs (for access localized
          service, where each entry contains an GIN
          identity and) with validity information/
          condition {
                  GIN 131;

...
          }
  }                       911
}
```

VALIDITY/RESTRICTION INFORMATION of SNPN 121
{
 time validity info associated with SNPN 121 (ex:
Jan-1st ~ Jan-2nd) and/or
 location validity info associated with SNPN 121
}

VALIDITY/RESTRICTION INFORMATION of SNPN 123
{
 time validity info associated with SNPN 123 (ex:
Jan-1st ~ Jan-3rd) and/or
 location validity info associated with SNPN 123
}

VALIDITY/RESTRICTION INFORMATION of GIN
131
{
 time validity info associated with GIN 131 (ex:
Jan-1st ~ Jan-3rd) and/or
 location validity info associated with GIN 131
}

FIG. 9B

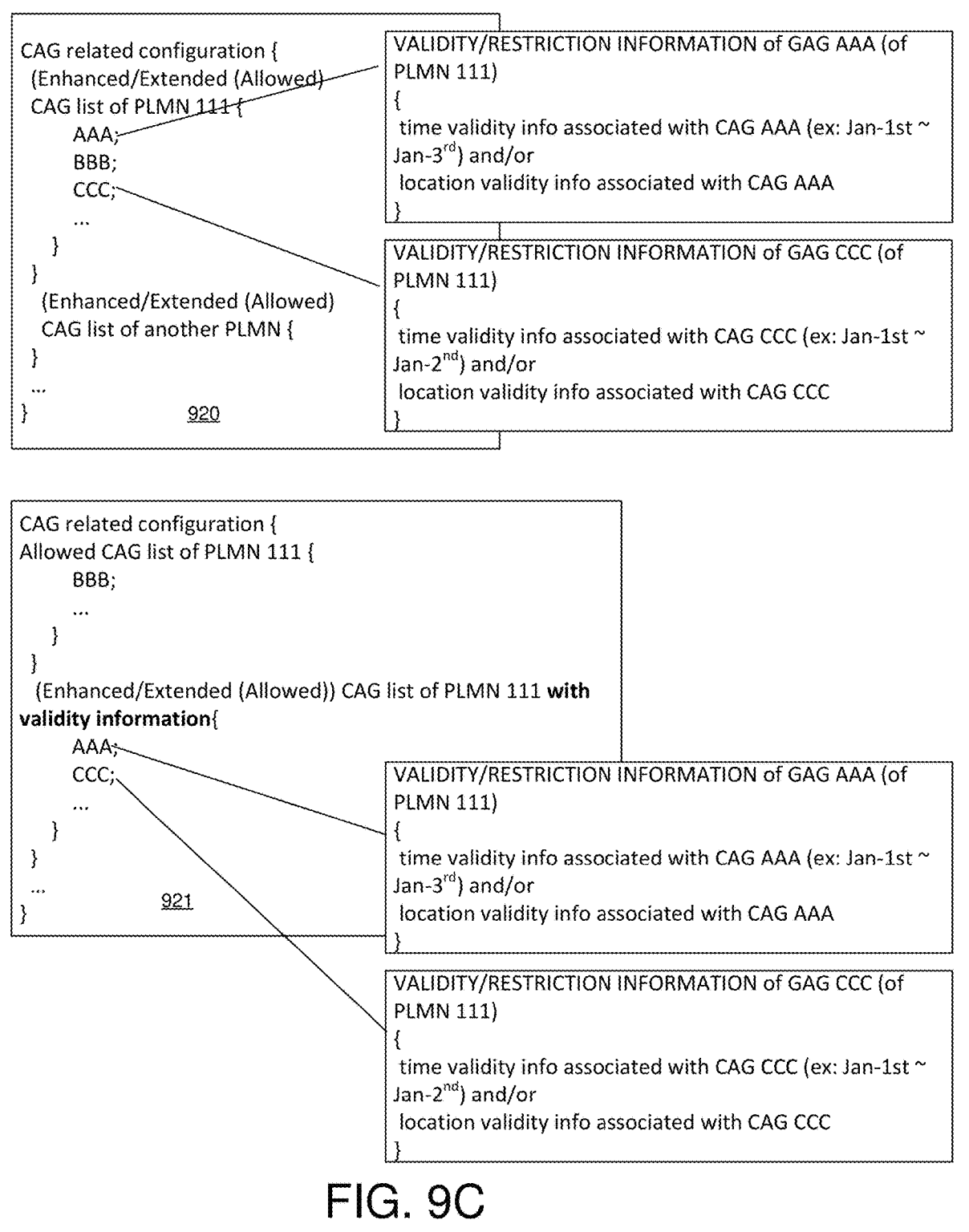

CAG related configuration {
(Enhanced/Extended (Allowed)
CAG list of PLMN 111 {
        AAA;
        BBB;
        CCC;
        ...
    }
}
  (Enhanced/Extended (Allowed)
   CAG list of another PLMN {
    }
...
}                       920

VALIDITY/RESTRICTION INFORMATION of GAG AAA (of
PLMN 111)
{
 time validity info associated with CAG AAA (ex: Jan-1st ~
Jan-3$^{rd}$) and/or
 location validity info associated with CAG AAA
}

VALIDITY/RESTRICTION INFORMATION of GAG CCC (of
PLMN 111)
{
 time validity info associated with CAG CCC (ex: Jan-1st ~
Jan-2$^{nd}$) and/or
 location validity info associated with CAG CCC
}

CAG related configuration {
Allowed CAG list of PLMN 111 {
        BBB;
        ...
    }
}
  (Enhanced/Extended (Allowed)) CAG list of PLMN 111 **with
validity information**{
        AAA;
        CCC;
        ...
    }
}
...                       921
}

VALIDITY/RESTRICTION INFORMATION of GAG AAA (of
PLMN 111)
{
 time validity info associated with CAG AAA (ex: Jan-1st ~
Jan-3$^{rd}$) and/or
 location validity info associated with CAG AAA
}

VALIDITY/RESTRICTION INFORMATION of GAG CCC (of
PLMN 111)
{
 time validity info associated with CAG CCC (ex: Jan-1st ~
Jan-2$^{nd}$) and/or
 location validity info associated with CAG CCC
}

FIG. 9C

Figure 13:
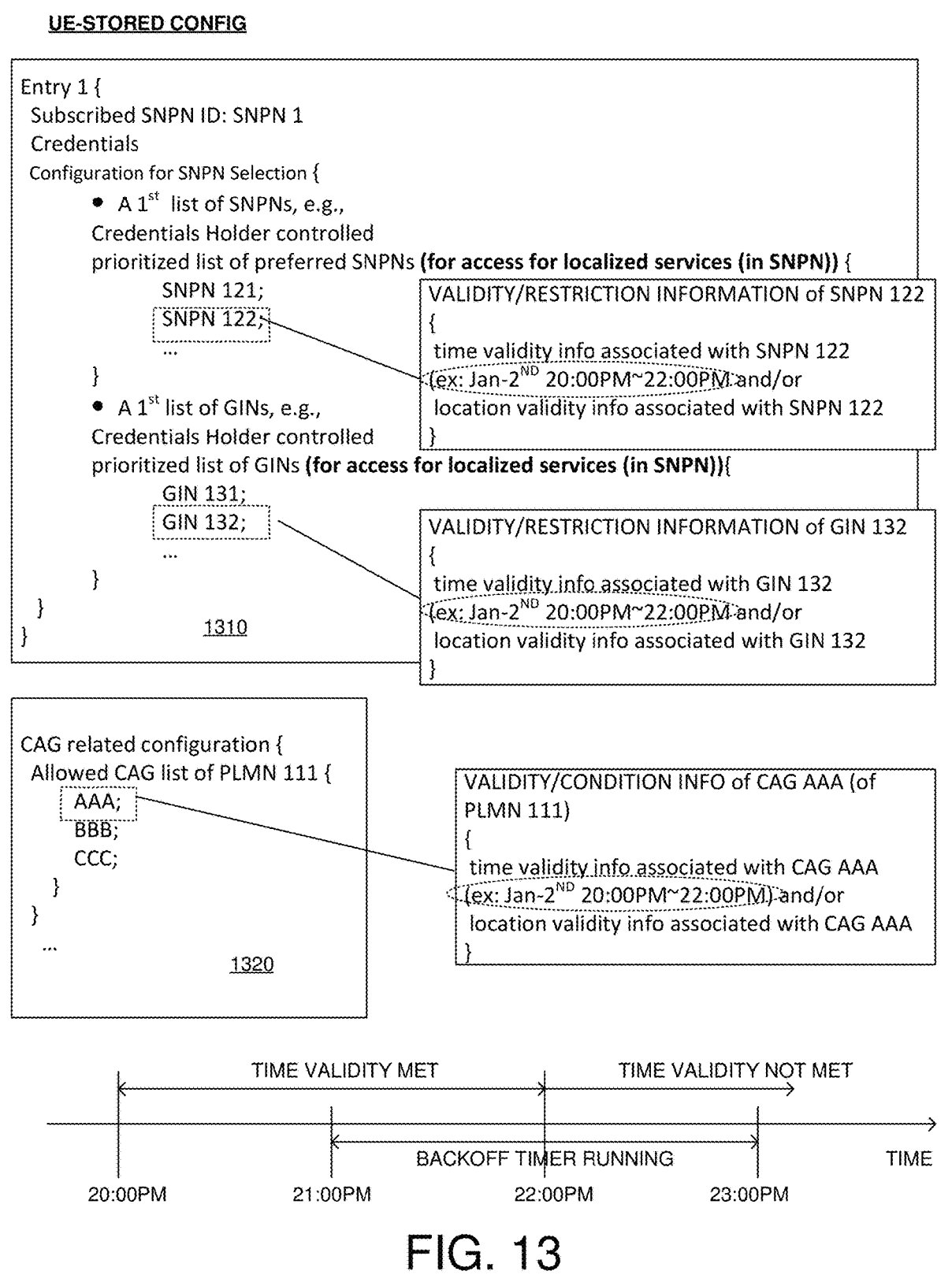

UE-STORED CONFIG

Entry 1 {
 Subscribed SNPN ID: SNPN 1
 Credentials
 Configuration for SNPN Selection {

• A 1st list of SNPNs, e.g.,
 Credentials Holder controlled
 prioritized list of preferred SNPNs (for access for localized services (in SNPN)) {

SNPN 121;
        SNPN 122;
        ...
   }

• A 1st list of GINs, e.g.,
 Credentials Holder controlled
 prioritized list of GINs (for access for localized services (in SNPN)){

GIN 131;
        GIN 132;
        ...
   }
 }
}
          1310

VALIDITY/RESTRICTION INFORMATION of SNPN 122
{
 time validity info associated with SNPN 122
 (ex: Jan-2ND 20:00PM~22:00PM) and/or
 location validity info associated with SNPN 122
}

VALIDITY/RESTRICTION INFORMATION of GIN 132
{
 time validity info associated with GIN 132
 (ex: Jan-2ND 20:00PM~22:00PM) and/or
 location validity info associated with GIN 132
}

CAG related configuration {
 Allowed CAG list of PLMN 111 {
    AAA;
    BBB;
    CCC;
   }
 }
 ...
       1320

VALIDITY/CONDITION INFO of CAG AAA (of
PLMN 111)
{
 time validity info associated with CAG AAA
 (ex: Jan-2ND 20:00PM~22:00PM) and/or
 location validity info associated with CAG AAA
}

TIME VALIDITY MET          TIME VALIDITY NOT MET

BACKOFF TIMER RUNNING       TIME

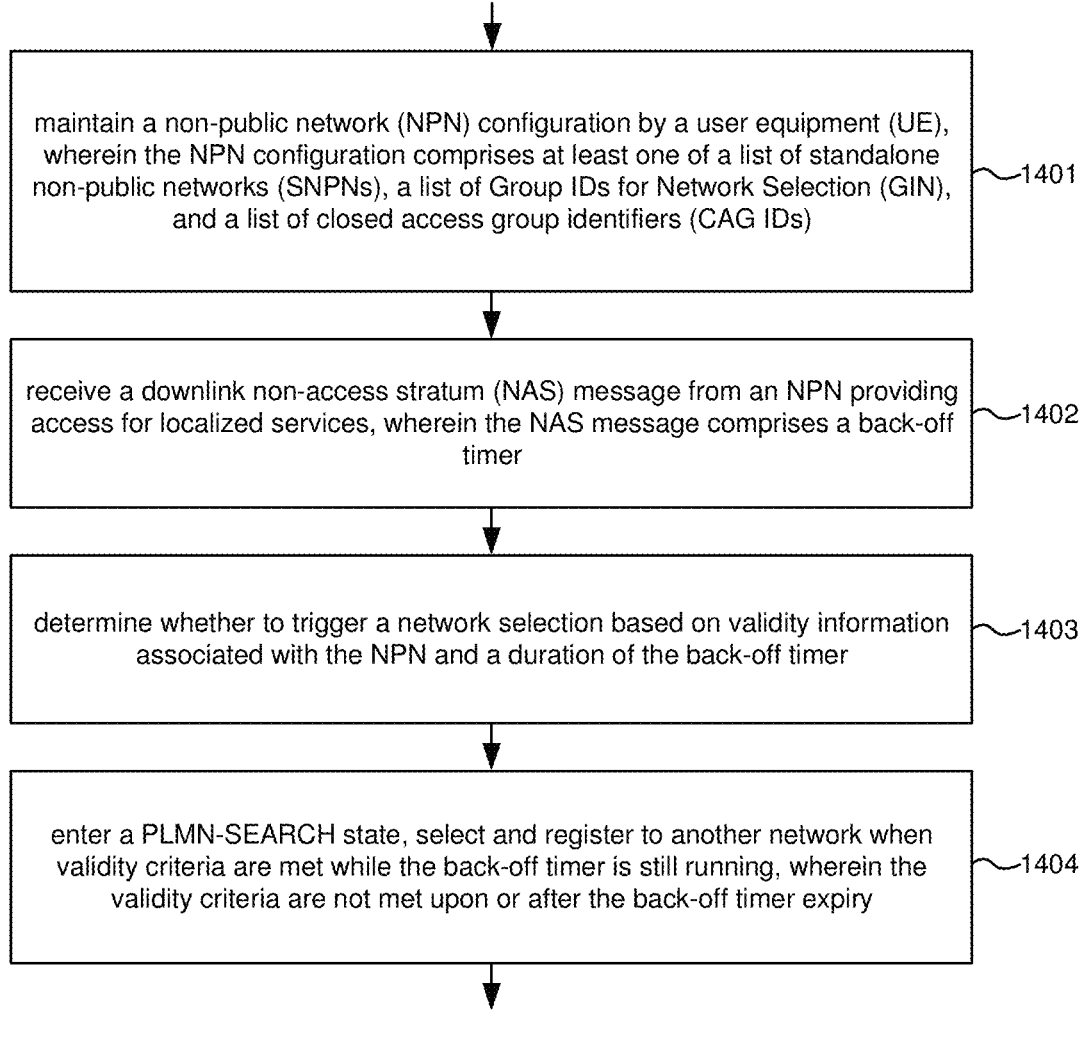

maintain a non-public network (NPN) configuration by a user equipment (UE), wherein the NPN configuration comprises at least one of a list of standalone non-public networks (SNPNs), a list of Group IDs for Network Selection (GIN), and a list of closed access group identifiers (CAG IDs) —1401 receive a downlink non-access stratum (NAS) message from an NPN providing access for localized services, wherein the NAS message comprises a back-off timer —1402 determine whether to trigger a network selection based on validity information associated with the NPN and a duration of the back-off timer —1403 enter a PLMN-SEARCH state, select and register to another network when validity criteria are met while the back-off timer is still running, wherein the validity criteria are not met upon or after the back-off timer expiry —1404

FIG. 14

CONGESTION CONTROL BACKOFF TIMER HANDLING FOR HOSTING NETWORK

CROSS REFERENCE TO RELATED APPLICATIONS

This application claims priority under 35 U.S.C. § 119 from U.S. Provisional Application No. 63/336,376, entitled "Local Service Provided by NPN (PNI-NPN or SNPN-NPN) (NPN for localized services)", filed on Apr. 29, 2022, the subject matter of which is incorporated herein by reference.

TECHNICAL FIELD

The disclosed embodiments relate generally to wireless mobile communication network, and, more particularly, to methods of congestion timer start handling for hosting network.

BACKGROUND

A Public Land Mobile Network (PLMN) is a network established and operated by an administration or recognized operating agency (ROA) for the specific purpose of providing land mobile communication services to the public. PLMN provides communication possibilities for mobile users. A PLMN may provide service in one or a combination of frequency bands. Access to PLMN services is achieved by means of an air interface involving radio communications between mobile phones and base stations with integrated IP network services. One PLMN may include multiple radio access networks (RAN) utilizing different radio access technologies (RAT) for accessing mobile services. A radio access network is part of a mobile communication system, which implements a radio access technology. Conceptually, RAN resides between a mobile device and provides connection with its core network (CN). Depending on the standard, mobile phones and other wireless connected devices are varyingly known as user equipment (UE, i.e., MS), terminal equipment (TE), mobile stations (MS, i.e., UE), mobile termination (MT), etc. Examples of different RATs include 2G GERAN (GSM) radio access network, 3G UTRAN (UMTS) radio access network, 4G E-UTRAN (LTE), 5G new radio (NR) radio access network, NG-RAN (Next-Generation RAN), and other non-3GPP access RAT including WiFi.

As compared to PLMN, a non-public network (NPN) is a network for non-public use. An NPN is either a Stand-alone Non-Public Network (SNPN), i.e., operated by an NPN operator and not relying on network functions provided by a PLMN; or a Public Network Integrated NPN (PNI-NPN), i.e., a non-public network deployed with the support of a PLMN. A Credentials Holder (CH) may authenticate and authorize access to an SNPN separate from the Credentials Holder. The combination of a PLMN ID and Network identifier (NID) identifies an SNPN. A UE may be enabled for SNPN.

PNI-NPNs are NPNs made available via PLMNs e.g., by means of dedicated DNNs, or by one (or more) Network Slice instances allocated for the NPN. When a PNI-NPN is made available via a PLMN, then the UE shall have a subscription of the PLMN in order to access PNI-NPN. As network slicing does not enable the possibility to prevent UEs from trying to access the network in areas where the UE is not allowed to use the Network Slice allocated for the NPN, Closed Access Groups can be used to apply access control for PNI-NPN. A Closed Access Group (CAG) identifies a group of subscribers who are permitted to access one or more CAG cells associated to the CAG. CAG is used for the PNI-NPNs to prevent UE(s), which are not allowed to access the NPN via the associated cell(s), from automatically selecting and accessing the associated CAG cell(s). CAG is used for access control e.g., authorization at cell selection and configured in the subscription as part of the Mobility Restrictions. A CAG is identified by a CAG Identifier which is unique within the scope of a PLMN ID.

Local or Localized services are services that are localized (e.g., provided at specific/limited area and/or are bounded in time). A localized service provider is an application provider or a network operator who make their services localized and to be offered to end user via a hosting network. A hosting network is a network that provides (access for) Localized services, and a hosting network can be an SNPN or a PNI-NPN, while a home network is network owning the current in use subscription or credential of the UE. Home network can be either Home-PLMN or Subscribed-SNPN. End user can enable or disable to access Localized services. If the end user disables to access Localized services, the UE (i.e., MS) may not access an NPN providing access for Localized services.

For providing (access for) Localized services to UE, UE needs to be able to discover, select and access an NPN (as hosting network) providing access for Localized services.

SUMMARY

A method of backoff timer handling for accessing a hosting network for localized services is proposed. When a UE receives a NAS message from an NPN hosting network with a backoff timer, the UE needs to determine whether it can register to the NPN as a hosting network for localized services while the backoff timer is running. The UE checks the validity information associated with the NPN, e.g., an SNPN/GIN/CAG, and determines whether the UE is still authorized to access the NPN upon/after backoff timer expiry. In one example, if the current time+the remaining length/duration of the backoff timer is longer than the end of the validity time of the NPN, then the UE triggers the network selection (SNPN selection or PLMN selection) and registers to another PLMN, PNI-NPN/CAG or SNPN for access for localized services, or just for normal services (non-localized services).

Other embodiments and advantages are described in the detailed description below. This summary does not purport to define the invention. The invention is defined by the claims.

BRIEF DESCRIPTION OF THE DRAWINGS

FIG. 5A illustrates an example of an SNPN-enabled UE that is configured with 2 SNPN subscriptions (i.e., 2 subscribed SNPNs in the "list of subscriber data").

FIG. 5B illustrates an example of an SNPN-enabled UE that is configured with 2 PLMN subscriptions (i.e., 2 USIMs).

FIG. 6 illustrates Network selection in SNPN access mode with automatic SNPN network selection and manual SNPN network selection.

FIG. 8A illustrates a first embodiment of network and cell selection and access control of CAG cells for PNI-NPN (CAG), where access to a CAG cell is rejected.

FIG. 8B illustrates a second embodiment of network and cell selection and access control of non-CAG cells (public cells), where access to a PLMN is rejected.

FIG. 9A illustrates one example of UE to discover, select and access NPN (as hosting network) providing access for Localized services using validity information.

FIG. 9B illustrates another example of UE to discover, select and access NPN (as hosting network) and receive localized services using validity information associated with an SNPN.

FIG. 9C illustrates different examples of UE to discover, select and access NPN (as hosting network) and receive localized services using validity information associated with a CAG (of a PLMN).

FIG. 13 illustrates an example of different NPN configuration and associated validity information when providing localized services.

FIG. 14 is a flow chart of a method of backoff timer handling when an NPN is a hosting network for localized services in accordance with one novel aspect.

DETAILED DESCRIPTION

Reference will now be made in detail to some embodiments of the invention, examples of which are illustrated in the accompanying drawings.

Figures 1, 2:
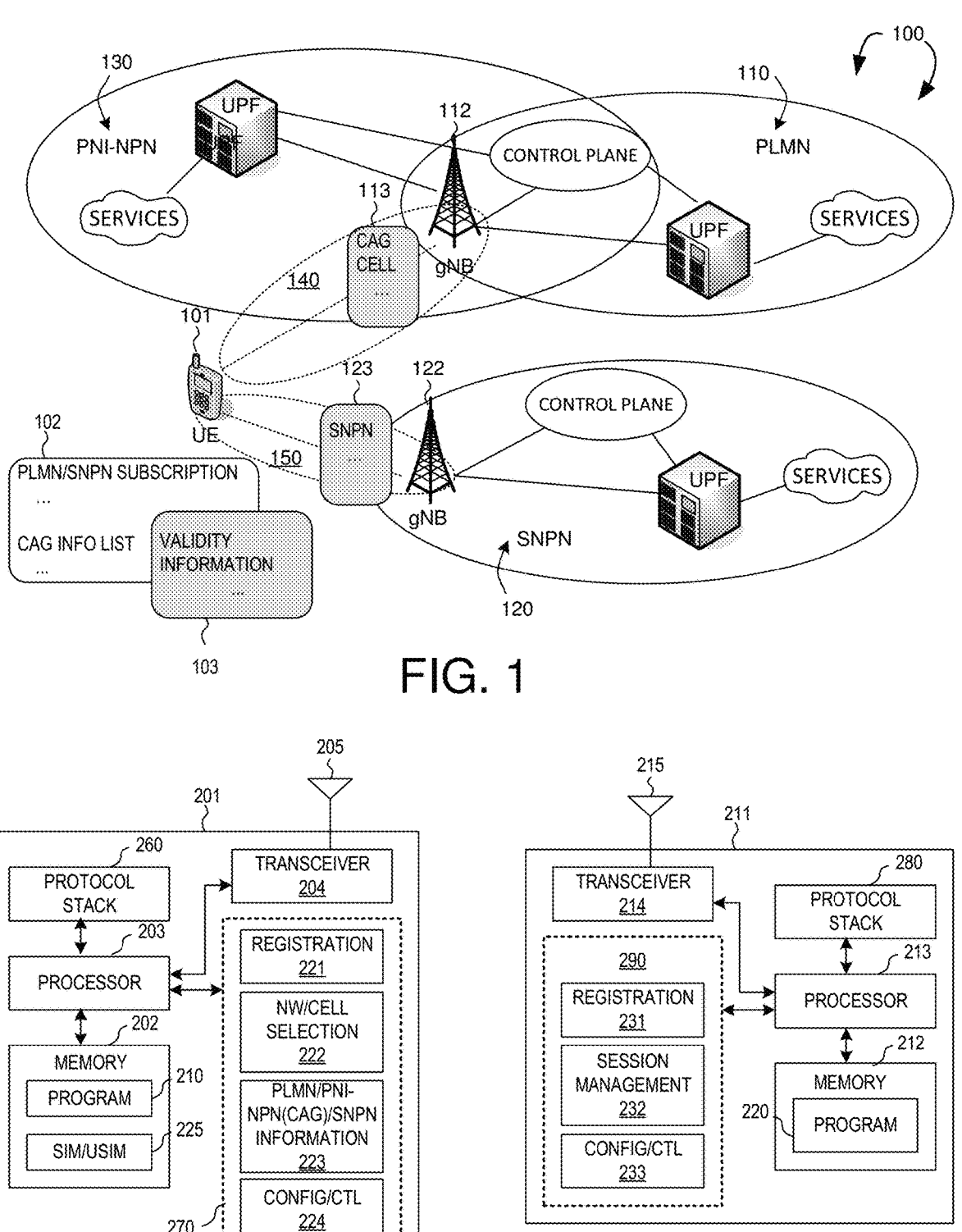
FIG. 1 schematically shows a communication system having a Public Land Mobile Network (PLMN), a Stand-alone Non-public Network (SNPN), and a Public Network Integrated NPN (PNI-NPN) supporting (hosting) network and cell selection with Localized services in accordance with one novel aspect.
FIG. 2 illustrates simplified block diagrams of a user equipment and a network entity in accordance with embodiments of the current invention.

FIG. 1 schematically shows a communication system 100 having a Public Land Mobile Network (PLMN) 110, a Stand-alone Non-public Network (SNPN) 120, and a Public Network Integrated NPN (PNI-NPN)/CAG 130 providing access for Localized services in accordance with one novel aspect. PLMN network 110 comprises control plane functionalities, user plane functionality (e.g., UPF), and applications that provides various services by communicating with a plurality of user equipments (UEs) including UE 101. Serving base station gNB 112 belong to part of a radio access network RAN 140. RAN 140 provides radio access for UE 101 via a radio access technology (RAT). An access and mobility management function (AMF) in PLMN 110 communicates with gNB 112. UE 101 may be equipped with a radio frequency (RF) transceiver or multiple RF transceivers.

SNPN network 120 comprises control plane functionalities, user plane functionality (e.g., UPF), and applications that provides various services by communicating with a plurality of user equipments (UEs) including UE 101. The combination of a PLMN ID and Network identifier (NID) identifies an SNPN. Serving base station gNB 122 belongs to part of RAN 150. RAN 150 provides radio access for UE 101 via a RAT. An AMF in SNPN 120 communicates with gNB 122. SNPN 120 is operated by an NPN operator and does not rely on network functions provided by a public network. A Credentials Holder (CH) may authenticate and authorize access to an SNPN separate from the Credentials Holder. NG-RAN nodes which provide access to SNPNs broadcast the following information: One or multiple PLMN IDs, and a List of NIDs per PLMN ID identifying the non-public networks NG-RAN provides access to (123). An SNPN-enabled UE is configured with PLMN ID and NID (SNPN ID) of the subscribed SNPN, and an SNPN-enabled UE that supports access to an SNPN using credentials from a Credentials Holder may additionally be configured with information for SNPN selection (SNPN selection information or configuration) and registration using the SNPN subscription or using PLMN subscription (USIM) (in SNPN access mode) (102).

PNI-NPN (CAG) network 130 comprises control plane functionalities (optional, it may rely on PLMN's control plane functionality), user plane functionality (optional, it may rely on PLMN's user plane functionality), and applications that provides various services by communicating with a plurality of user equipments (UEs) including UE 101. PNI-NPN (CAG) 130 is a non-public network deployed with the support of a PLMN, e.g., PLMN 110, by sharing e.g., RAN/gNB 112 and e.g., control plane functionalities. A Closed Access Group (CAG) identifies a group of subscribers who are permitted to access one or more CAG cells associated to the CAG. CAG is used for the PNI-NPNs to prevent UE(s), which are not allowed to access the NPN via the associated cell(s), from automatically selecting and accessing the associated CAG cell(s). A CAG is identified by a CAG Identifier which is unique within the scope of a PLMN ID. A CAC cell broadcasts one or multiple CAG Identifiers per PLMN (113), and a UE is configured with CAG related configuration/information (e.g., an (enhanced) CAG information list containing list of allowed CAGs per PLMN) (102).

Local or Localized services are services that are localized (i.e., provided at specific/limited area and/or are bounded in time (a specific period of time)). A localized service provider is an application provider or a network operator who makes their services localized and to be offered to end user via a hosting network. A hosting network is a network that provides access for localized services and can be an SNPN or a PNI-NPN, while a home network is network owning the current in use subscription or credential of the UE. In the example of FIG. 1, both SNPN 120 and PNI-NPN (CAG) 130 can be a hosting network providing access for Localized services to UE 101.

A URSP rule may include an association of the UE application and the DNN or network slice which is meant for a specific localized service. A URSP rule can also include "Route Selection Validity Criteria" (Time Window and/or a Location Criteria Validity Conditions) with the time/location defined for the specific localized service. The LADN (Local Access Data Network) can also be used for enabling the UE access to localized service.

To enable a PNI-NPN or SNPN to provide access to localized services, the PNI-NPN or SNPN operator config-ures the network with information enabling the UEs to access the localized services according to validity of the localized services, and the information is determined in agreement with the localized service provider, e.g.: (a) Identification of each localized service, e.g. to be used in URSP rules; (b) validity criteria/restriction for each local-ized service, e.g., the validity of time duration and/or (area of) location.

When localized services in a network are completed, all UEs registered with the network are expected to be moved to other network or to other cells within the same network. The other network can be HPLMN, VPLMN or another SNPN. UE can stop using the network resources for local-ized services for numerous reasons, e.g.: (a) Localized services in a network are completed; (b) Validity conditions of network selection information are no longer met; (c) The user decides to stop using the localized services before they are completed (e.g., end user disables to access Localized services); (d) A policy decision is taken by the network, with the effect that the UE is deregistered before the localized services are completed. Validity information or restrictions or criteria or conditions (103) are provided or configured to UE as part of the localized service information, which are used to restrict the UE's access of the SNPN/PNI-NPN (as hosting network) providing access for Localized services. For providing localized services to UE, UE needs to be able to discover, select and access a SNPN/PNI-NPN (as hosting network) providing access for the Localized services. The discovery mechanism is based on provisioning or configur-ing the UE with appropriate information.

FIG. 2 illustrates simplified block diagrams of wireless devices, e.g., a UE 201 and network entity 211 in accordance with embodiments of the current invention. Network entity 211 may be a base station combined with an AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 pro-cesses the received baseband signals and invokes different functional modules to perform features in base station 211. Memory 212 stores program instructions and data 220 to control the operations of base station 211. In the example of FIG. 2, network entity 211 also includes a set of control functional modules and circuit 290. Registration circuit 231 handles registration and mobility procedure. Session man-agement circuit 232 handles session management function-alities. Configuration and control circuit 233 provides dif-ferent parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a con-troller, a microcontroller, application specific integrated circuits (ASICs), file programmable gate array (FPGA) circuits, and other type of integrated circuits (ICs), and/or state machines. A processor in associated with software may be used to implement and configure features of UE 201.

Figure 3A:
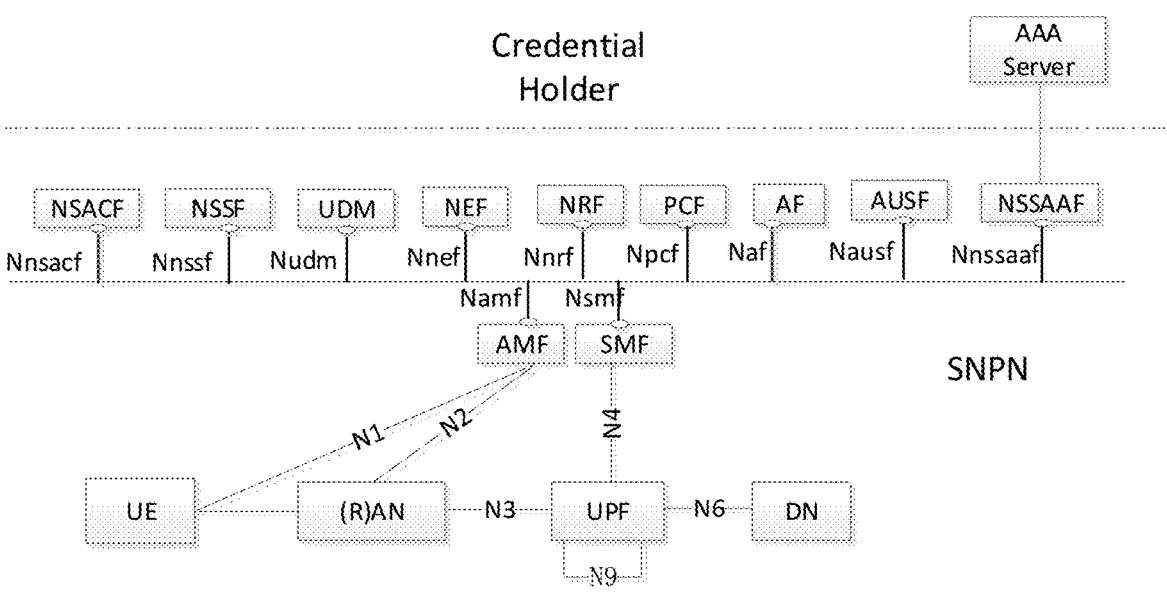
FIG. 3A illustrates a first embodiment of a 5G system architecture with access to SNPN using credentials from credentials holder.

UE 201 also comprises a set of functional modules and control circuits to carry out functional tasks of UE 201. Protocol stacks 260 comprise Non-Access-Stratum (NAS) layer to communicate with an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combi-nation thereof. The function modules and circuits, when executed by the processors via program instructions con-tained in the memory, interwork with each other to allow UE 201 to perform embodiments and functional tasks and features in the network. In one example, system modules and circuits 270 comprise registration circuit 221 that per-forms registration and mobility procedure with the network, a network and cell selection circuit 222 for performing network and cell selection, a PLMN/PNI-NPN(CAG)/ SNPN information maintenance circuit 223 that handles the adding, removing, and resetting of one or more PLMN/PNI-NPN(CAG)/SNPN information in SIM/USIM and/or in UE (non-volatile) memory (source of the information may come from signaling as well), a config and control circuit 224 that handles configuration and control parameters. Note that the network selection and registration related information, such as HPLMN, Operator Controlled PLMN/SNPN Selector list, User Controlled PLMN/SNPN Selector list, may be stored in SIM/USIM 225 and/or in UE (non-volatile) memory. SNPN FIG. 3A illustrates a first embodiment of a 5G system architecture with access to SNPN using credentials from credentials holder. FIG. 3A depicts the 5G System architec-ture for SNPN with Credentials Holder using AAA Server for primary authentication and authorization. The AUSF and the UDM in SNPN may support primary authentication and authorization of UEs using credentials from a AAA Server in a Credentials Holder (CH). The SNPN in FIG. 3A can be the subscribed SNPN for the UE (i.e. NG-RAN broadcasts SNPN ID of the subscribed SNPN). As a deployment option, the SNPN in FIG. 3A can also be another SNPN than the subscribed SNPN for the UE (i.e. none of the SNPN IDs broadcast by NG-RAN matches the SNPN ID corresponding to the subscribed SNPN). The NSSAAF deployed in the SNPN can support primary authentication in the SNPN using credentials from Credentials Holder using a AAA Server (as depicted) and/or the NSSAAF can support Net-work Slice-Specific Authentication and Authorization with a Network Slice-Specific AAA Server (not depicted).

Figure 3B:
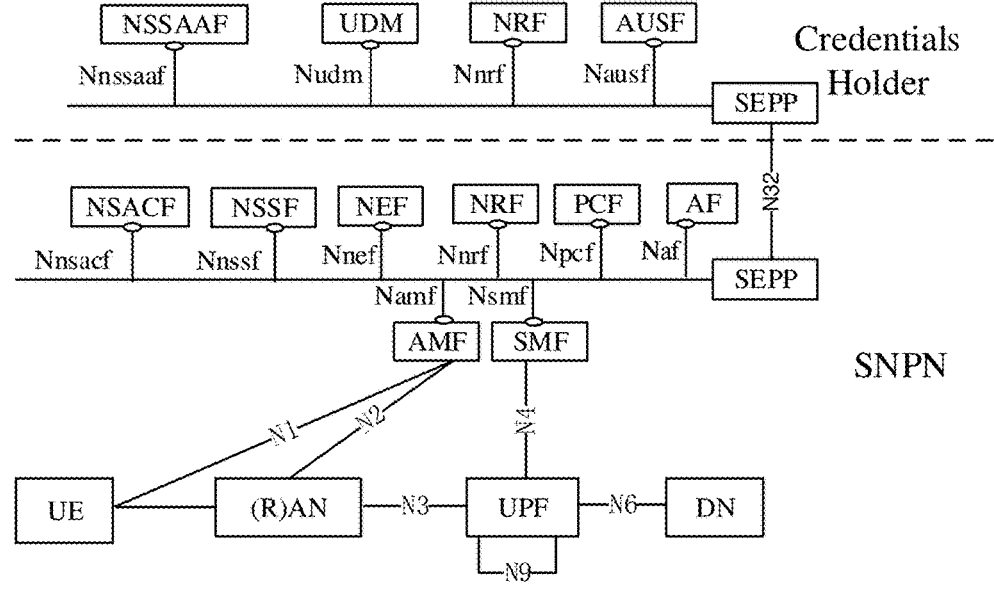
FIG. 3B illustrates a second embodiment of a 5G system architecture with access to SNPNs using credentials from credentials holder.

FIG. 3B illustrates a second embodiment of a 5G system architecture with access to SNPNs using credentials from credentials holder. FIG. 3B depicts the 5G System architecture for SNPN with Credentials Holder using AUSF and UDM for primary authentication and authorization and network slicing. An SNPN may support primary authentication and authorization of UEs that use credentials from a Credentials Holder using AUSF and UDM. The Credentials Holder may be an SNPN or a PLMN. The Credentials Holder UDM provides to SNPN the subscription data.

Figure 4:
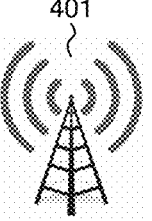
FIG. 4 illustrates an example of NG-RAN modes which broadcast certain information in order to provide access to SNPNs.

FIG. 4 illustrates an example of NG-RAN mode(s) which broadcasts certain information in order to provide access to SNPNs. A Credentials Holder (CH) may authenticate and authorize access to an SNPN separate from the Credentials Holder. For SNPN identification, the combination of a PLMN ID and Network identifier (NID) identifies an SNPN. The NID supports two assignment models. Under self-assignment model, NIDs are chosen individually by SNPNs at deployment time (and may therefore not be unique) but use a different numbering space than the coordinated assignment NIDs. Under coordinated assignment model, NIDs are assigned using one of the following two options: 1) The NID is assigned such that it is globally unique independent of the PLMN ID used; or 2) The NID is assigned such that the combination of the NID and the PLMN ID is globally unique.

The Group IDs for Network Selection (GIN) supports two assignment models. Under self-assignment model, GINs are chosen individually and may therefore not be unique. Under coordinated assignment model, GIN uses a combination of PLMN ID and NID and is assigned using one of the following two options: 1) The GIN is assigned such that the NID is globally unique (e.g., using IANA Private Enterprise Numbers) independent of the PLMN ID used; or 2) The GIN is assigned such that the combination of the NID and the PLMN ID is globally unique.

In the example of FIG. 4, NG-RAN 401 provides access to SNPNs and broadcasts the following information (410): One or multiple PLMN IDs and List of NIDs per PLMN ID identifying the non-public networks the NG-RAN provides access to (e.g., SNPN 1 and SNPN 2). Optionally, the broadcasted information further includes the following: a human-readable network name (HRNN) per SNPN; an indication per SNPN of whether access using credentials from a Credentials Holder is supported; a list of supported Group IDs for Network Selection (GINs) per SNPN (e.g., GIN 1 and GIN 2); and an indication per SNPN of whether the SNPN allows registration attempts from UEs that are not explicitly configured to select the SNPN, i.e., UEs that do not have any SNPN ID (PLMN ID+NID) nor GIN broadcast by the SNPN in the Credentials Holder controlled prioritized lists of preferred SNPNs/GINs.

FIG. 5A illustrates an example of an SNPN-enabled UE that is configured with SNPN subscription information for each subscribed SNPN. In the example of FIG. 5A, an SNPN-enabled UE 501 is configured with the 2 SNPN subscriptions as depicted by 510/520 for each subscribed SNPN: SNPN ID (PLMN ID+NID) of the subscribed SNPN (e.g., SNPN 1 in Entry 1 of the "list of subscriber data", SNPN 2 in Entry 2 of the "list of subscriber data"); and Subscription identifier (SUPI) and credentials for each of the subscribed SNPN. If the UE supports access to an SNPN using credentials from a Credentials Holder for each subscribed SNPN: 1) User controlled prioritized list of preferred SNPNs (e.g., SNPN 111, SNPN 112 for Entry 1; SNPN 211, SNPN 212 for Entry 2); 2) Credentials Holder controlled prioritized list of preferred SNPNs (e.g., SNPN 121, SNPN 122 for Entry 1; SNPN 221, SNPN 222 for Entry 2); and 3) Credentials Holder controlled prioritized list of GINs (e.g., GIN131, GIN132 for Entry 1; GIN 231, GIN 232 for Entry 2).

FIG. 5B illustrates an example of an SNPN-enabled UE that is configured with 2 PLMN subscriptions (i.e., 2 USIMs). An SNPN-enabled UE that supports access to an SNPN using credentials from a Credentials Holder and that is equipped with a PLMN subscription (USIM) may additionally be configured with information for SNPN selection and registration using the PLMN subscription (in SNPN access mode). For example, PLMN subscription 1 is associated with information for SNPN selection 530: 1) User controlled prioritized list of preferred SNPNs (e.g., SNPN 311, SNPN 312); 2) Credentials Holder controlled prioritized list of preferred SNPNs (e.g., SNPN 321, SNPN 322); and 3) Credentials Holder controlled prioritized list of GINs (e.g., GIN 331, GIN 332). Similarly, PLMN subscription 2 is associated with information for SNPN selection 540: 1) User controlled prioritized list of preferred SNPNs (e.g., SNPN 411, SNPN 412); 2) Credentials Holder controlled prioritized list of preferred SNPNs (e.g., SNPN 421, SNPN 422); and 3) Credentials Holder controlled prioritized list of GINs (e.g., GIN 431, GIN 432).

A subscription of an SNPN is either identified by a SUPI containing a network-specific identifier that takes the form of a Network Access Identifier (NAI). The realm part of the NAI may include the NID of the SNPN; or identified by a SUPI containing an IMSI. For an SNPN-enabled UE with SNPN subscription, the Credentials Holder controlled prioritized lists of preferred SNPNs/GINs may be updated by the CH using the Steering of Roaming (SoR) procedure. For an SNPN-enabled UE with PLMN subscription, the Credentials Holder controlled prioritized lists of preferred SNPNs/GINs may be updated by the CH using the Steering of Roaming (SoR) procedure. When the Credentials Holder updates a UE with the Credentials Holder controlled prioritized lists of preferred SNPNs and GINs, the UE may perform SNPN selection again, e.g., to potentially select a higher prioritized SNPN.

FIG. 6 illustrates Network selection in SNPN access mode with automatic SNPN network selection and manual SNPN network selection. An SNPN-enabled UE 601 supports to access SNPN (in SNPN access mode). When the UE is set to operate in SNPN access mode the UE only selects and registers with SNPNs. When a UE is set to operate in SNPN access mode the UE does not perform normal PLMN selection procedures. There are two SNPN network selection procedures: an automatic SNPN network selection procedure and a manual SNPN network selection procedure.

Under automatic SNPN network selection, UE selects and attempts registration on available and allowable SNPNs in the following order: 1) the SNPN the UE was last registered with (if available) or the equivalent SNPN (if available); 2) the subscribed SNPN, which is identified by the SNPN ID (PLMN ID+NID) for which the UE has SUPI and credentials; 3) if the UEs supports access to an SNPN using credentials from a Credentials Holder then the UE continues by selecting and attempting registration on available and allowable SNPNs which broadcast the indication that access using credentials from a Credentials Holder is supported in the following order: a) SNPNs in the user controlled prioritized list of preferred SNPNs (in priority order); b) SNPNs in the Credentials Holder controlled prioritized list of preferred SNPNs (in priority order); c) SNPNs, which additionally broadcast a GIN contained in the Credentials Holder controlled prioritized list of preferred GINs (in priority order); and 4) SNPNs, which additionally broadcast an indication that the SNPN allows registration attempts from UEs that are not explicitly configured to select the SNPN, i.e. the broadcasted SNPN ID or GIN is not present in the Credentials Holder controlled prioritized lists of preferred SNPNs/GINs in the UE.

In the example of FIG. 6, UE 601 was registered to SNPN 100, the subscribed SNPN is SNPN 1 and has three lists for credentials. The User controller prioritized list of preferred SNPNs includes SNPN 111, SNPN 112; the Credential Holder controlled prioritized list of preferred SNPNs includes SNPN 121, SNPN 122; the Credential Holder controlled prioritized list of GINs includes GIN 131, GIN 132. There are a list of SNPNs/GINs (broadcasted by one or more NG-RANs) available in current UE location e.g., SNPN 100, SNPN 1, SNPN 111, SNPN 112, SNPN 121, SNPN 300/GIN 131. UE 601 selects and attempts to register to an SNPN in the following preference/priority order: SNPN 100, SNPN 1, SNPN 111, SNPN 112, SNPN 121, and SNPN 300 which also broadcasts GIN 131.

Under manual network selection, UEs operating in SNPN access mode provide to the user the list of SNPNs (each is identified by a PLMN ID and NID) and related human-readable network names (if available) of the available SNPNs the UE has respective SUPI and credentials for. If the UEs supports access to an SNPN using credentials from a Credentials Holder, the UE also presents available SNPNs which broadcast the "access using credentials from a Credentials Holder is supported" indication and the human-readable names related to the SNPNs (if available). When a UE performs Initial Registration to an SNPN, the UE shall indicate the selected PLMN ID and NID as broadcast by the selected SNPN to NG-RAN. NG-RAN shall inform the AMF of the selected PLMN ID and NID.

If a UE performs the registration or service request procedure in an SNPN identified by a PLMN ID and a self-assigned NID and there is no subscription for the UE, then the AMF shall reject the UE with an appropriate cause code to temporarily prevent the UE from automatically selecting and registering with the same SNPN. If a UE performs the registration or service request procedure in an SNPN identified by a PLMN ID and a coordinated assigned NID and there is no subscription for the UE, then the AMF shall reject the UE with an appropriate cause code to permanently prevent the UE from automatically selecting and registering with the same SNPN. If a UE performs the registration in an SNPN using credentials from a Credentials Holder and UE is not authorized to access that specific SNPN, then the UDM can reject the UE which results in AMF rejecting the registration request from the UE with an appropriate cause code to prevent the UE from selecting and registering with the same SNPN using credentials from the Credentials Holder. In order to prevent access to SNPNs for authorized UE(s) in the case of network congestion/overload, Unified Access Control information is configured per SNPN (i.e., as part of the subscription information that the UE has for a given SNPN) and provided to the UE.

PNI-NPN (CAG)

PNI-NPNs (CAGs) are NPNs made available via PLMNs e.g., by means of dedicated DNNs, or by one (or more) Network Slice instances allocated for the NPN. The existing network slicing functionalities apply. When a PNI-NPN is made available via a PLMN, then the UE shall have a subscription for the PLMN in order to access PNI-NPN. A Closed Access Group (CAG) identifies a group of subscribers who are permitted to access one or more CAG cells associated to the CAG. CAG is used for the PNI-NPNs to prevent UE(s), which are not allowed to access the NPN via the associated cell(s), from automatically selecting and accessing the associated CAG cell(s). A CAG is identified by a CAG Identifier which is unique within the scope of a PLMN ID. A CAG cell broadcasts one or multiple CAG Identifiers per PLMN. A CAG cell may in addition broadcast a human-readable network name (HRNN) per CAG Identifier.

To use CAG, the UE, that supports CAG as indicated as part of the UE 5GMM Core Network Capability, may be pre-configured or (re)configured with the following CAG related information. If the UE supports CAG, the UE can be provisioned by the network with a CAG related configuration (e.g., (enhanced) CAG information (list) containing list of allowed CAGs per PLMN)), consisting of zero or more entries, each entry containing a) a PLMN ID, b) an "Allowed CAG list" having zero or more CAG-IDs, and c) an optional "indication that the UE is only allowed to access 5GS via CAG cells". The HPLMN may (pre-)configure or re-configure a UE with the above CAG related configuration using the UE Configuration Update procedure or other 5GMM procedures (e.g., registration procedure or service procedure). The above CAG related configuration is provided by the HPLMN on a per PLMN basis. In a PLMN the UE shall only consider the CAG information provided for this PLMN.

When the subscribed CAG related configuration changes, UDM sets a CAG information Subscription Change Indication and sends it to the AMF. The AMF shall provide the UE with the CAG related configuration when the UDM indicates that the CAG related configuration within the Access and Mobility Subscription data has been changed. When AMF receives the indication from the UDM that the CAG related configuration within the Access and Mobility Subscription has changed, the AMF uses the CAG related configuration received from the UDM to update the UE. Once the AMF updates the UE and obtains an acknowledgment from the UE, the AMF informs the UDM that the update was successful and the UDM clears the CAG information Subscription Change Indication flag. The AMF may update the UE using either the UE Configuration Update procedure after registration procedure is completed, or by including the new CAG related configuration in the Registration Accept or in the Registration Reject or in the Deregistration Request or in the Service Reject.

When the UE is roaming and the Serving PLMN provides CAG related configuration, the UE shall update only the CAG related configuration provided for the Serving PLMN, while the stored CAG related configuration for other PLMNs is not updated. When the UE is not roaming and the HPLMN provides CAG related configuration, the UE shall update the CAG related configuration stored in the UE with the received CAG related configuration for all the PLMNs. The UE shall store the latest available CAG related configuration for every PLMN for which it is provided and keep it stored when the UE is de-registered or switched off. The CAG related configuration is only applicable with 5GS.

For network and cell selection, the CAG cell shall broadcast information such that only UEs supporting CAG are accessing the cell; cells are either CAG cells or normal PLMN cells (non CAG cells). For access control, in order to prevent access to NPNs for authorized UE(s) in the case of network congestion or overload, existing mechanisms defined for Control Plane load control, congestion and overload control can be used, as well as the access control and barring functionality, or Unified Access Control using the access categories can be used. The Mobility Restrictions shall be able to restrict the UE's mobility according to the Allowed CAG list (if configured in the subscription) and include an indication whether the UE is only allowed to access 5GS via CAG cells (if configured in the subscription).

During transition from CM-IDLE to CM-CONNECTED and during Registration after connected mode mobility from E-UTRAN to NG-RAN, the AMF shall verify whether UE access is allowed by Mobility Restrictions. If the UE is accessing the 5GS via a CAG cell and if at least one of the CAG Identifier(s) received from the NG-RAN is part of the UE's Allowed CAG list, then the AMF accepts the NAS request. If the UE is accessing the 5GS via a CAG cell and if none of the CAG Identifier(s) received from the NG-RAN are part of the UE's Allowed CAG list, then the AMF rejects the NAS request and the AMF can include CAG related configuration in the NAS reject message. The AMF then release the NAS signaling connection for the UE by triggering the AN release procedure. If the UE is accessing the 5GS via a non-CAG cell and the UE's subscription contains an indication that the UE is only allowed to access 5GS via CAG cells, then the AMF rejects the NAS request and the AMF should include CAG related configuration in the NAS reject message. The AMF then release the NAS signaling connection for the UE by triggering the AN release procedure.

During transition from RRC Inactive to RRC Connected state, when the UE initiates the RRC Resume procedure for RRC Inactive to RRC Connected state transition in a CAG cell, NG-RAN shall reject the RRC Resume request from the UE if none of the CAG Identifiers supported by the CAG cell are part of the UE's Allowed CAG list according to the Mobility Restrictions received from the AMF or if no Allowed CAG list has been received from the AMF. When the UE initiates the RRC Resume procedure for RRC Inactive to RRC Connected state transition in a non-CAG cell, NG-RAN shall reject the UE's Resume request if the UE is only allowed to access CAG cells according to the Mobility Restrictions received from the AMF.

During connected mode mobility procedures within NG-RAN, i.e., handover procedures, source NG-RAN shall not handover the UE to a target NG-RAN node if the target is a CAG cell and none of the CAG Identifiers supported by the target CAG cell are part of the UE's Allowed CAG list in the Mobility Restriction List or if no Allowed CAG list has been received from the AMF. Source NG-RAN shall not handover the UE to a non-CAG cell if the UE is only allowed to access CAG cells based on the Mobility Restriction List. If the target cell is a CAG cell, target NG-RAN shall reject the N2 based handover procedure if none of the CAG Identifiers supported by the CAG cell are part of the UE's Allowed CAG list in the Mobility Restriction List or if no Allowed CAG list has been received from the AMF. If the target cell is a non-CAG cell, target NG-RAN shall reject the N2 based handover procedure if the UE is only allowed to access CAG cells based on the Mobility Restriction List. When the AMF receives the Nudm_SDM_Notification from the UDM and the AMF determines that the Allowed CAG list or the indication whether the UE is only allowed to access CAG cells have changed, AMF shall update the Mobility Restrictions in the UE and NG-RAN accordingly under the conditions.

Figure 7A:
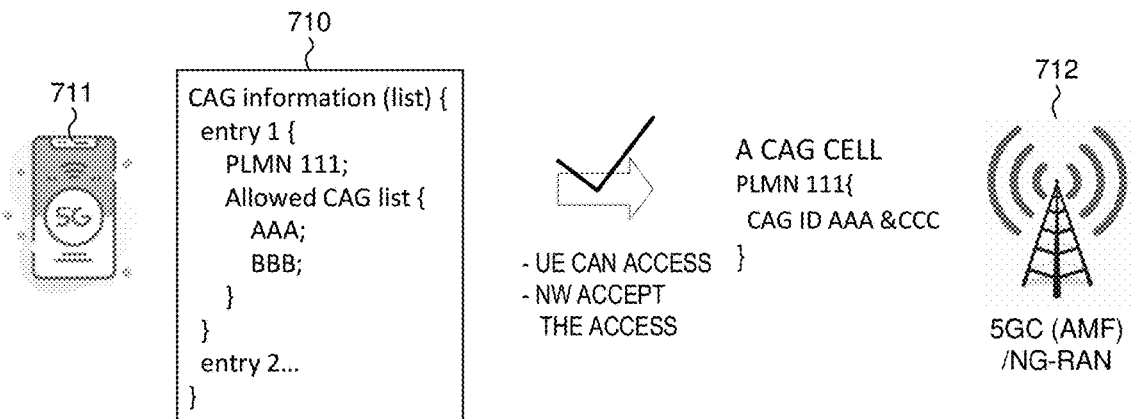
FIG. 7A illustrates a first embodiment of network and cell selection and access control of CAG cells for PNI-NPN (CAG), where access to a CAG cell is accepted.

FIG. 7A illustrates a first embodiment of network and cell selection and access control of CAG cells for PNI-NPN (CAG), where access to a CAG cell is accepted. In the example of FIG. 7A, UE 711 is configured with a CAG related configuration (e.g., CAG information list 710), comprising a list of entries. For each entry, it comprises a) a PLMN ID, b) an "Allowed CAG list" having zero or more CAG-IDs, and c) an optional "indication that the UE is only allowed to access 5GS via CAG cells". For example, entry 1 comprises PLMN 111, and an allowed CAG list with CAG-ID AAA and BBB. Through 5GC/AMF and NG-RAN, a CAG cell broadcasts one or more CAG-IDs per PLMN, e.g., CAG-ID AAA and CCC can be accessed via the CAG cell 712. As a result, UE 711 can access the CAG cell 712 in PLMN 111.

Figure 7B:
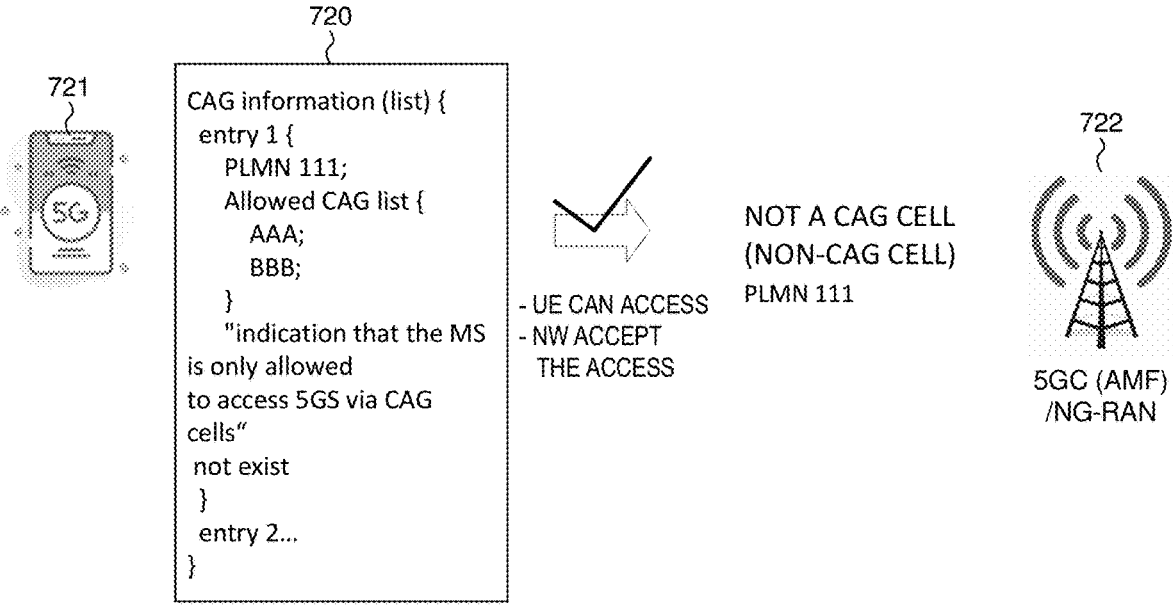
FIG. 7B illustrates a second embodiment of network and cell selection and access control of non-CAG cells (public cells), where access to a PLMN is accepted.

FIG. 7B illustrates a second embodiment of network and cell selection and access control of non-CAG cells, where access to a PLMN is accepted. In the example of FIG. 7B, UE 721 is configured with a CAG related configuration (e.g., CAG information list 720), comprising a list of entries. For each entry, it comprises a) a PLMN ID, b) an "Allowed CAG list" having zero or more CAG-IDs, and c) an optional "indication that the UE is only allowed to access 5GS via CAG cells". For example, entry 1 comprises PLMN 111, and an allowed CAG list with CAG-ID AAA and BBB. In addition, there is no indication in entry 1 that indicates the UE is only allowed to access 5GS via CAG cells. Through 5GC/AMF and NG-RAN 722, UE 721 finds non-CAG cell in PLMN 111 (i.e., no CAG IDs are broadcasted by the cell 722). Since UE 721 is allowed to access 5GS via non-CAG cell, as a result, UE 721 can access the non-CAG cell 722 in PLMN 111.

FIG. 8A illustrates a first embodiment of network and cell selection and access control of CAG cells for PNI-NPN (CAG), where access to a CAG cell is rejected. In the example of FIG. 8A, UE 811 is configured with a CAG related configuration (e.g., CAG information list 810), comprising a list of entries. For each entry, it comprises a) a PLMN ID, b) an "Allowed CAG list" having zero or more CAG-IDs, and c) an optional "indication that the UE is only allowed to access 5GS via CAG cells". For example, entry 1 comprises PLMN 111, and an allowed CAG list with CAG-ID AAA and BBB. Through 5GC/AMF and NG-RAN 812, a CAG cell broadcasts one or more CAG-IDs per PLMN, e.g., CAG-ID CCC and DDD. However, neither CAG-ID CCC nor CAG-ID DDD are in the "Allowed CAG list". As a result, UE 811 cannot access this CAG cell CCC/DDD of PLMN 111.

FIG. 8B illustrates a second embodiment of network and cell selection and access control of CAG cells for PNI-NPN (CAG), where access to a PLMN is rejected. In the example of FIG. 8B, UE 821 is configured with a CAG related configuration (CAG information list 820), comprising a list of entries. For each entry, it comprises a) a PLMN ID, b) an "Allowed CAG list" having zero or more CAG-IDs, and c) an optional "indication that the UE is only allowed to access 5GS via CAG cells". For example, entry 1 comprises PLMN 111, and an allowed CAG list with CAG-ID AAA and BBB. In addition, there an indication in entry 1 that indicates the UE is only allowed to access 5GS via CAG cells. Through 5GC/AMF and NG-RAN 822, UE 821 finds non-CAG cell in PLMN 111 (i.e., no CAG cell IDs are broadcasted by the cell 822). Since UE 821 is not allowed to access 5GS via non-CAG cell, as a result, UE 821 cannot access the non-CAG cell 822 in PLMN 111.

NPN (as Hosting Network) Providing Access for Localized Services.

Local or localized service is localized (i.e., provided at specific/limited area and/or can be bounded in time). The service can be realized via applications (e.g., live or on-demand audio/video stream, electric game, IMS, etc.), or connectivity (e.g., UE to UE, UE to Data Network, etc.). A localized service provider is an application provider or network operator who make their services localized and to be offered to end users via a hosting network, which is a network that provides access for local or Localized services. A home network is network owning the current in use subscription or credential of the UE. Home network can be either Home-PLMN or Subscribed-SNPN. An SNPN may support primary authentication and authorization of UEs that use credentials from a Credentials Holder using AUSF and UDM. The Credentials Holder may be Home-PLMN or Subscribed-SNPN. For SNPN as hosting network, home network can be regarded as CH. For PNI-NPN (CAG) as hosting network, home network can be regarded as (Home-) PLMN. For providing Localized services to UE, UE needs to be able to discover, select and access a NPN (as hosting network) providing access for the Localized services. The discovery mechanism is based on provisioning/(pre-)config-uring/signaling the UE with appropriate information.

FIG. 9A illustrates one example of UE to discover, select and access NPN (as hosting network) and receive localized services using validity information. When UE accesses the NPN (as Hosting network) using the subscription/creden-tials of its home network, only two cases are considered. If Home network (/CH) is PLMN, the Hosting network can be PNI-NPN or SNPN. If Home network (/CH) is SNPN, the Hosting network can be only SNPN. If the UE accesses the Hosting network using subscriptions or credentials from the UE Home network, and the UE has multiple credentials or subscriptions, the UE needs to determine which credential or subscription to be used to access the Hosting network. Validity information or conditions information provided to the UE as part of the localized service information can be used to restrict the UE's access of the hosting network, including: (time and/or location) validity information or conditions information ((Time and/or Location:) duration, criteria, or restriction) associated with SNPN (ID) or GIN; and (time and/or location) validity information/conditions ((Time and/or Location:) duration, criteria, or restriction) associated with PNI-NPN/CAG-ID.

As depicted by 910, an SNPN-enabled UE is configured with the following information for each subscribed SNPN: PLMN ID and NID (SNPN ID) of the subscribed SNPN (e.g., SNPN 1); and Subscription identifier (SUPI) and credentials for the subscribed SNPN. If the UE supports access to an SNPN using credentials from a Credentials Holder, then the UE is also configured with 1) User con-trolled prioritized list of preferred SNPNs (e.g., SNPN 111, SNPN 112); 2) Credentials Holder controlled prioritized list of preferred SNPNs (e.g., SNPN 121, SNPN 122, SNPN 123); and 3) Credentials Holder controlled prioritized list of GINs (e.g., GIN 131, GIN 132).

FIG. 9B illustrates another example of UE to discover, select and access NPN (as hosting network) and receive localized services using validity information. For automatic network selection, in the case of SNPN (as hosting network) for Localized services, there can be associated (time (dura-tion) and/or location (restriction)) validity information for SNPN(s) or GIN(s). For one example, as depicted by 910, (1) the existing Credentials Holder controlled prioritized list of preferred SNPNs (and GINs) can be extended with the (time and/or location) validity information or conditions information for each entry in the list; or as another example depicted by 911, (2) there can be a (or more) new list type defined to provide entries with validity information for SNPNs (and GINs) (ex: define new CH controlled priori-tized lists of preferred SNPNs/GINs (for access localized service, where each entry contains an SNPN/GIN identity and/) including (optional) validity information/conditions).

As depicted by 910 or 911, SNPN 121 has associated time (duration) validity condition (the time duration (e.g., start and end time) in which the UE is allowed to access the SNPN 121) of January-$1^{st}$~January-$2^{nd}$, SNPN 123 has associated time validity condition of January-$1^{st}$~January-$3^{rd}$, and GIN 131 has associated time (duration) validity condition of January-$1^{st}$~January-$3^{rd}$. Such time (duration) validity/conditions information are provided to the UE as part of the localized service information to restrict the UE's access of the (hosting network) Localized services. The validity/conditions information can also optionally include location validity/conditions information, which can be in the form of geolocation and/or TAI(s)/Cell(s) (of serving net-work (serving PLMN/PNI-NPN or serving SNPN)), the location validity/conditions information can be used to assist the UE to know where to start searching for SNPNs hosting networks.

FIG. 9C illustrates another example of UE to discover, select and access NPN (as hosting network) and receive localized services using validity/conditions information. For automatic network selection, in the case of PNI-NPN with CAG, a CAG-ID (in the (enhanced/extended (allowed)) CAG list) can be optionally associated with time validity/conditions or restriction information (the time duration (e.g., start and end time) in which the UE is allowed to access the PNI-NPN/CAG) and/or location validity/conditions or restriction information. Time duration and/or location valid-ity/conditions or restriction may be provided together with the CAG Identifier. For example, the ((enhance/extended) Allowed) CAG list can be provided to UE and AMF for enforcement, to make sure that UE not accessing the CAG cell outside of the time duration or (/and) outside of the allowed-location. The location validity/conditions informa-tion can be in the form of geolocation and/or TAI(s)/Cell(s) (of serving network (serving PLMN/PNI-NPN or serving SNPN)), the location validity/conditions or restriction infor-mation can be used to assist the UE to know where to start searching for the PNI-NPN hosting networks.

Note that, as depicted by 920, the (time and/or location) validity information can be stored next to the CAG-ID (e.g., enhance/extend the original allowed CAG list), or stored independently in the UE and is associated to a (or more) CAG-ID; or as depicted by 921 there can be a (or more) new list type defined to provide entries with validity information for CAG(s). As depicted by 920, for example, the ((en-hanced/extended) Allowed) CAG list for PLMN 111 includes CAG AAA, BBB, and CCC. CAG-ID AAA is associated with time validity information of January-$1^{st}$~January-$3^{rd}$, and CAG-ID CCC is associated with time validity information of January-$1^{st}$~January-$2^{nd}$. Similar logic applies for location validity, if any. Such (time and location) validity conditions are provided to the UE as part of the localized service information to restrict the UE's access of the localized services (hosting network).

Figures 10A, 10B:
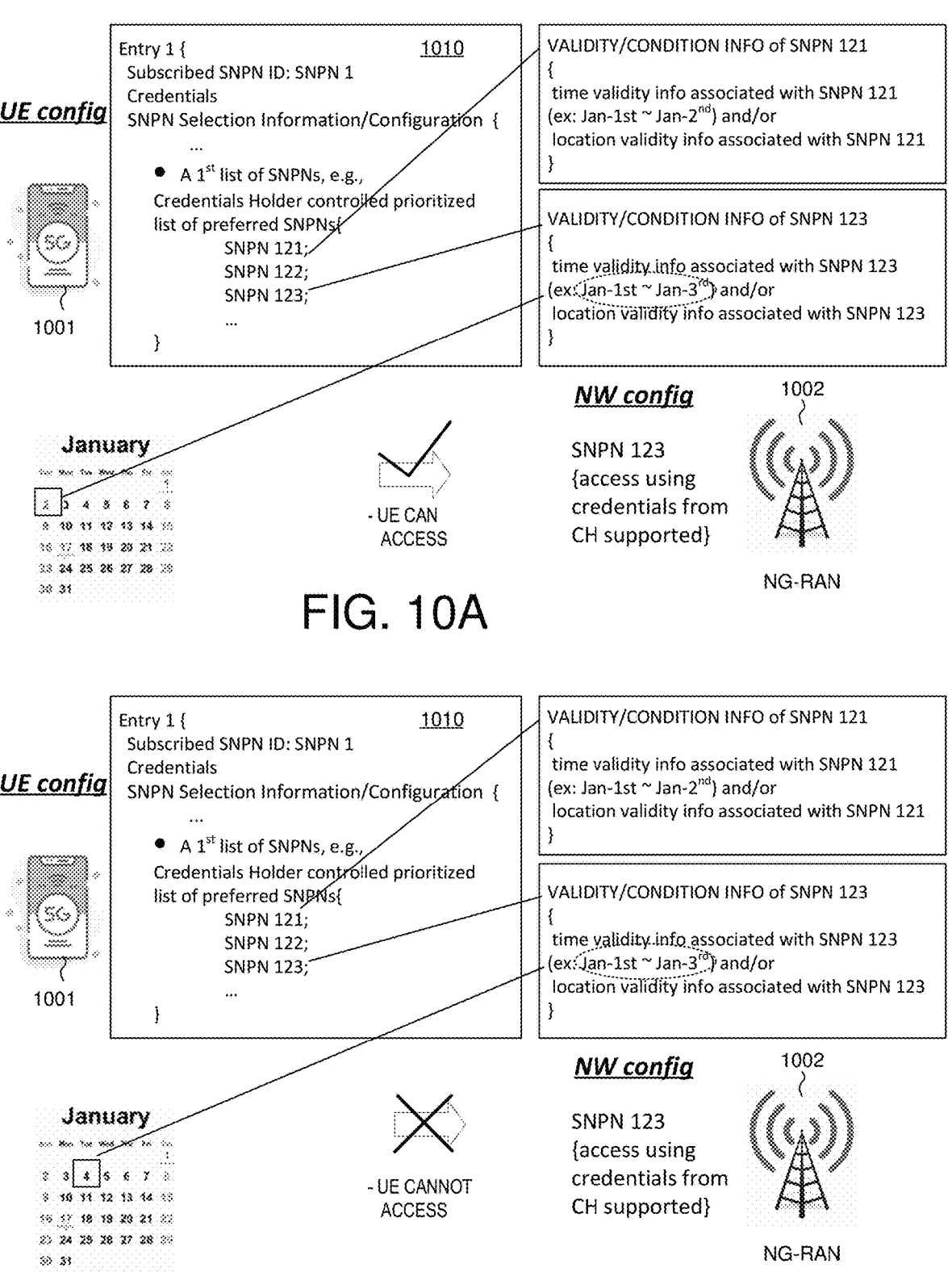
FIG. 10A illustrates a first example of accessing SNPN (as a hosting network) providing access for Localized services, where access is accepted.
FIG. 10B illustrates a second example of accessing SNPN (as a hosting network) providing access for Localized services, where access is rejected.

FIG. 10A illustrates a first example of accessing localized services via SNPN (as a hosting network), where access is accepted. In the example of FIG. 10A, UE 1001 is config-ured with the following SNPN subscription: the subscribed SNPN=SNPN 1, Credentials Holder controlled prioritized list of preferred SNPNs, which includes SNPN 121, SNPN 122, and SNPN 123. SNPN 121 is associated with time validity condition of January-$1^{st}$~January-$2^{nd}$, and SNPN 123 is associated with time validity condition of January-$1^{st}$~January-$3^{rd}$. Through 5GC/AMF and NG-RAN 1002, SNPN 123 broadcasts its SNPN ID==123, with an indica-tion of access using credentials from a Credentials Holder is supported. Since UE 1001 is subscribed to SNPN 1, and SNPN 123 is included as a preferred SNPN in the entry of "list of subscriber data" for SNPN1, UE 1001 may attempt to access SNPN 123 using credentials from SNPN 1. Since a time validity condition is associated with SNPN 123, UE 1001 needs to determine whether such time validity condition is satisfied before the access. UE 1001 checks the current time of January $2^{nd}$, which is inside the time period of January-$1^{st}$~January-$3^{rd}$. As a result, UE 1001 can access SNPN 123 using credentials from the (subscribed) SNPN 1. SNPN 123 is the localized service provider. SNPN 123 is the hosting network. SNPN 1 is the credential holder. (If location validity information is available, in this example we assume location validity is met per the location validity information.)

FIG. 10B illustrates a second example of accessing localized services via SNPN (as a hosting network), where access is not allowed (if UE tries to access, the network will reject). In the example of FIG. 10B, UE 1001 is configured with the following SNPN subscription: the subscribed SNPN=SNPN 1, a Credentials Holder controlled prioritized list of preferred SNPNs, which includes SNPN 121, SNPN 122, and SNPN 123. SNPN 121 is associated with time validity condition of January-$1^{st}$~January-$2^{nd}$, and SNPN 123 is associated with time validity condition of January-$1^{st}$~January-$3^{rd}$. Through 5GC/AMF and NG-RAN 1002, the hosting network SNPN 123 broadcasts its SNPN ID==123, with an indication of access using credentials from a Credentials Holder is supported. Since UE 1001 is subscribed to SNPN 1, and SNPN 123 is included as a preferred SNPN in the entry of "list of subscriber data" for SNPN 1, UE 1001 may attempt to access SNPN 123. However, since a time validity condition is associated with SNPN 123, UE 1001 also needs to additionally determine whether such time validity condition is satisfied before the access. UE 1001 checks the current time of January $4^{th}$, which is outside the time period of January-$1^{st}$~January-$3^{rd}$. As a result, UE 1001 cannot access SNPN 123 using credentials from SNPN 1.

Figures 11A, 11B:
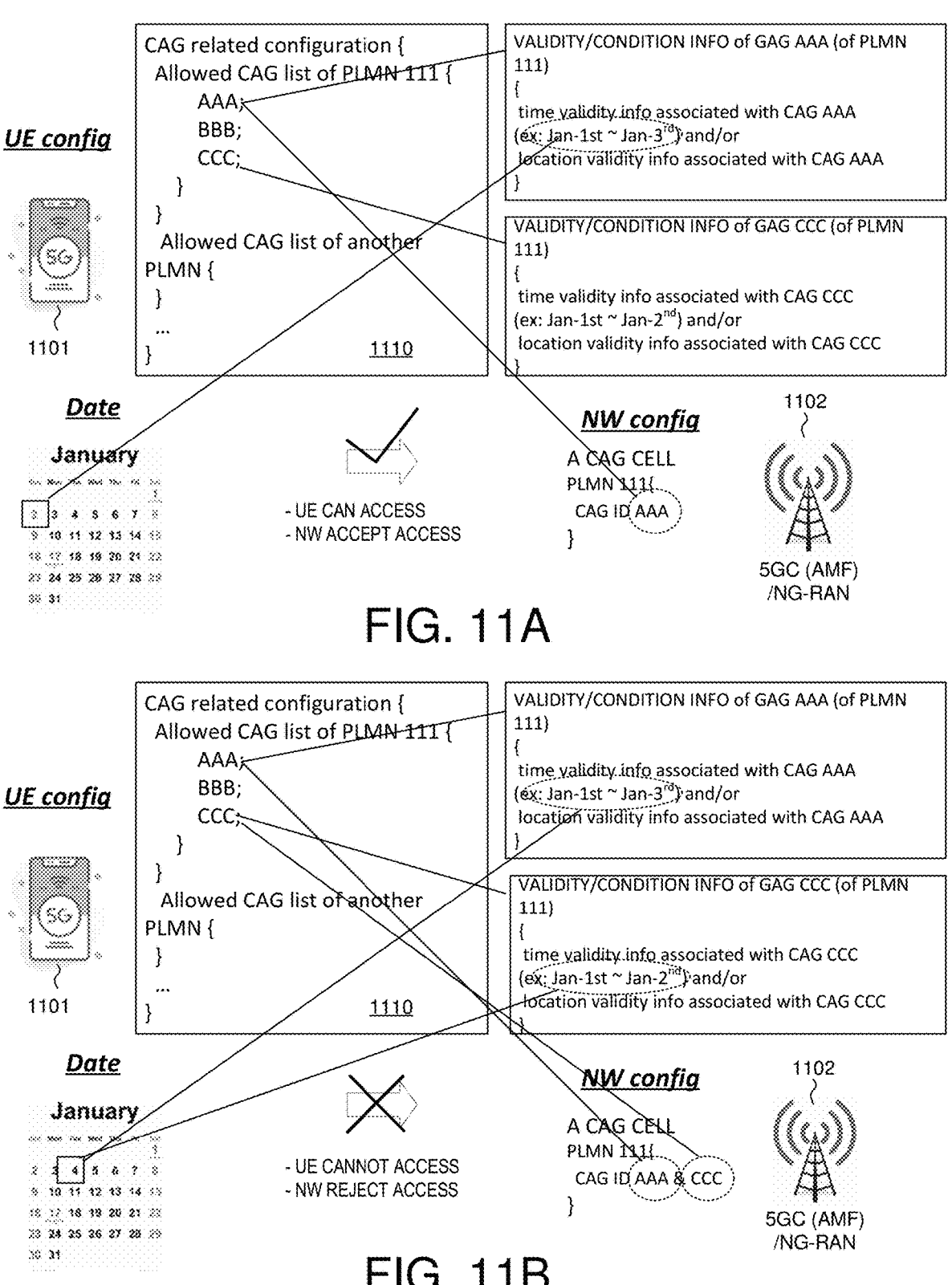
FIG. 11A illustrates a first example of accessing PNI-NPN/CAG (as a hosting network) providing access for Localized services, where access is accepted.
FIG. 11B illustrates a second example of accessing PNI-NPN/CAG (as a hosting network) providing access for Localized services, where access is rejected.

FIG. 11A illustrates a first example of accessing localized services via PNI-NPN with CAG (as a hosting network), where access is accepted. In the example of FIG. 11A, UE 1101 is configured with a CAG related configuration 1110, comprising a list of entries. For example, entry 1 comprises PLMN 111, and an enhanced or extended allowed CAG list with CAG-ID AAA, BBB and CCC. CAG AAA is associated with time validity condition of January-$1^{st}$~January-$3^{rd}$, and CAG CCC is associated with time validity condition of January-$1^{st}$~January-$2^{nd}$. Through 5GC/AMF and NG-RAN 1102, a CAG cell broadcasts one or more CAG-IDs per PLMN, e.g., CAG-ID AAA of PLMN 111. Since a time validity condition is associated with CAG AAA, UE 1001 needs to determine whether such time validity condition is satisfied before the access. UE 1101 checks the current time of January $2^{nd}$, which is inside the time period of January-$1^{st}$~January-$3^{rd}$ associated with CAG AAA. As a result, UE 1101 can access CAG AAA of PLMN 111 via the cell. (PNI-NPN/CAG-AAA is the service provider, PNI-NPN/CAG-AAA is the hosting network, Home PLMN of the currently used USIM is the home network, and Home PLMN is the credential holder.) (If location validity information is available, in this example, we assume location validity is met per the location validity information.)

FIG. 11B illustrates a second example of accessing localized services via PNI-NPN with CAG (as a hosting network), where access is rejected. In the example of FIG. 11B, UE 1101 is configured with a CAG related configuration 1110, comprising a list of entries. For example, entry 1 comprises PLMN 111, and an enhanced or extended allowed CAG list with CAG-ID AAA, BBB and CCC. CAG AAA is associated with time validity condition of January-$1^{st}$~January-$3^{rd}$, and CAG CCC is associated with time validity condition of January-$1^{st}$~January-$2^{nd}$. Through 5GC/AMF and NG-RAN 1102, a CAG cell broadcasts one or more CAG-IDs per PLMN, e.g., CAG-ID AAA and CAG-ID CCC of PLMN 111. Since time validity conditions are associated with CAG AAA and CCC, UE 1101 needs to determine whether such time validity conditions are satisfied before the access. UE 1101 checks the current time of January $4^{th}$, which is outside the time period of January-$1^{st}$~January-$3^{rd}$ associated with CAG AAA, and outside the time period of January-$1^{st}$~January-$2^{nd}$ associated with CAG CCC. As a result, UE 1101 cannot access CAG cell AAA or CCC.

Congestion Control Backoff Timer Handling for Hosting Network

In order to ensure that the network functions within 5G System are operating under nominal capacity for providing connectivity and necessary services to the UE, the network supports various measures to guard itself under various operating conditions (e.g. peak operating hour, extreme situations). The network includes support for load balancing, overload control, and NAS level congestion control. NAS level congestion control is achieved by providing the UE a backoff time. To avoid that large amounts of UEs initiate deferred requests (almost) simultaneously, the 5GC should select each back-off time value so that the deferred requests are not synchronized. When the UE receives a back-off time, the UE shall not initiate any NAS signaling with regards to the applied congestion control until the back-off timer expires or the UE receives a mobile terminated request from the network, or the UE initiates signaling for emergency services or high priority access.

For example, in 5GS, Single-Network Slice Selection Assistance Information (S-NSSAI) based backoff (BO) timers (T3584/T3585) can be applied to either the registered PLMN or all the PLMNs based on a 5GSM congestion re-attempt indicator. For network section, UE should not trigger a PLMN selection process when a mobility management back-off timer is running. However, if an NPN is a hosting network that provides access to localized services, then the UE may be authorized to access the NPN for a limited time duration, while the backoff timer is running. If the UE is not allowed to register to the NPN due to the backoff timer, then the UE may no longer be authorized to access the NPN upon backoff timer expiry.

In accordance with one novel aspect, a method of backoff timer handling for accessing a hosting network for localized services is proposed. When a UE receives a NAS message from an NPN hosting network (PNINPN/CAG, or SNPN) with a backoff timer, the UE needs to determine whether it can register to the NPN as a hosting network for localized services while the backoff timer is running. The UE checks the validity information associated with the NPN, e.g., an SNPN/GIN/CAG, and determines whether the UE is still authorized to access the NPN upon/after backoff timer expiry. In one example, if the current time+the remaining length/duration of the backoff timer is longer than the end of the validity time of the NPN, then the UE triggers the network selection (SNPN selection or PLMN selection) and registers to another PLMN, PNI-NPN/CAG or SNPN for access for localized services, or just for normal services (non-localized services).

In one example, the validity information includes only time validity information, wherein the validity criteria are met if the time validity information matches a current time of the UE, and wherein the validity criteria are not met if the time validity information does not match the current time of the UE. In another example, the validity information includes only location validity information, wherein the validity criteria are met if the location validity information matches a current location of the UE, and wherein the validity criteria are not met if the location validity information does not match the current location of the UE. In yet another example, the validity information includes both time validity information and location validity information, wherein the validity criteria are met if the time validity information matches a current time of the UE and the location validity information matches a current location of the UE, and wherein the validity criteria are not met if the time validity information does not match the current time of the UE or the location validity information does not match the current location of the UE.

Figure 12:
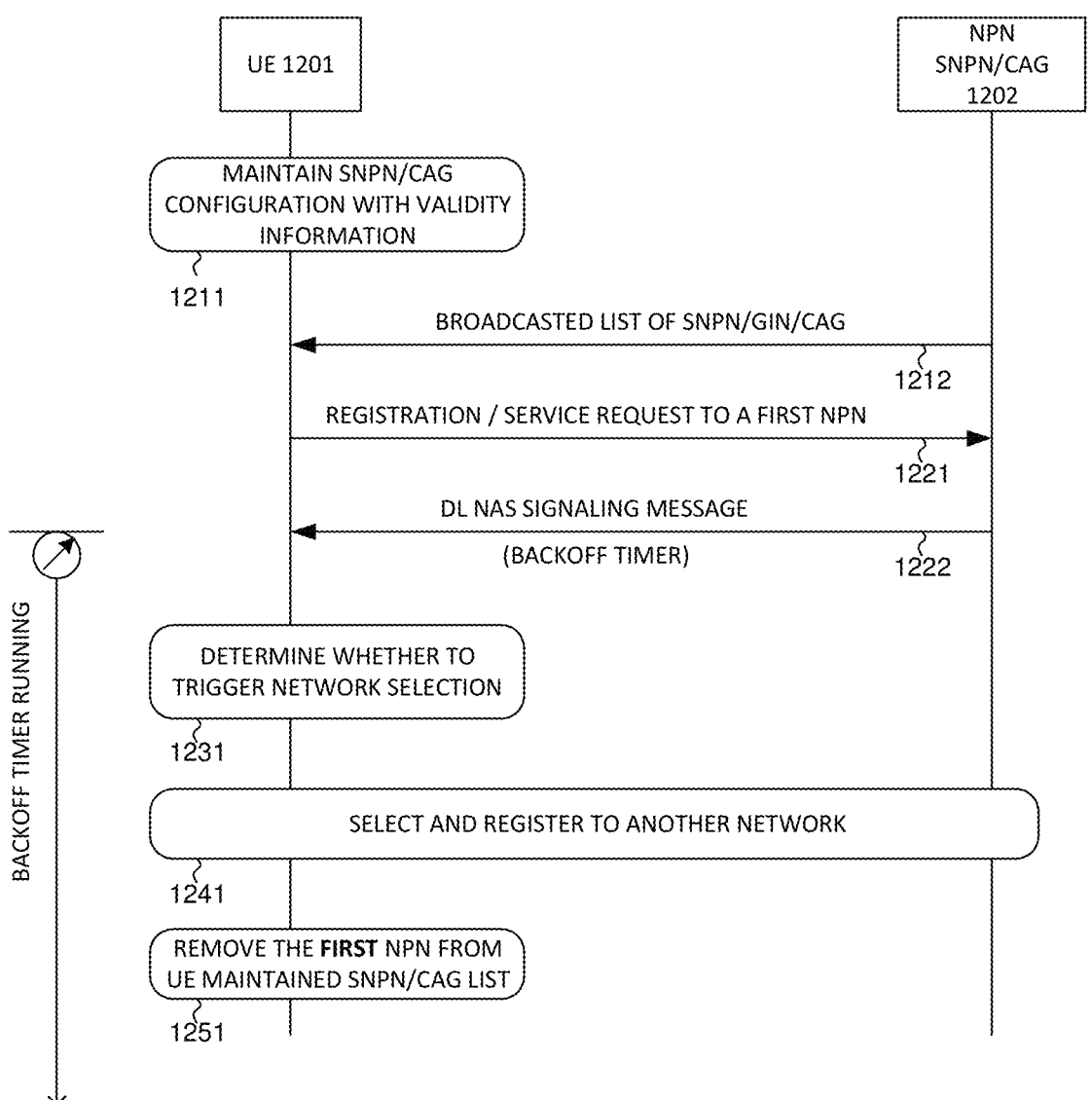
FIG. 12 illustrates the sequence flow between a UE, and an NPN for handling backoff timer when the NPN is a hosting network for localized services.

FIG. 12 illustrates the sequence flow between a UE, and an NPN for handling backoff timer when the NPN is a hosting network for localized services. In step 1211, UE 1201 maintains an NPN (SNPN/CAG) configuration, which includes configuration for SNPN selection (e.g., prioritized list of SNPNs/GINs (for access for localized services (in SNPN))) and/or CAG related configuration (e.g., allowed CAG-IDs). In step 1212, UE 1201 receives a list of SNPNs/GINs/CAGs (e.g., supported SNPNs/GINs/CAGs) broadcasted from the network. In step 1221, UE 1201 selects a first NPN and sends an uplink NAS message (e.g., a registration request message) to the first NPN based on the NPN configuration and the broadcasted list of SNPNs/GINs/CAGs. In step 1222, UE 1201 receives a downlink NAS message (e.g., a registration reject message) from the first NPN. Due to network congestion, the DL NAS message contains a backoff timer value, where the UE should start the backoff timer and refrain from initiating any NAS signaling in the same first NPN before the backoff timer expiry.

In step 1231, UE 1201 determines whether to trigger a network selection procedure while the backoff timer is running. For hosting network, the NPN is associated with validity information (e.g., time validity information) for localized services. The determination is thus based on the validity information associated with the NPN and the length/duration of the backoff timer. For example, the UE 1201 determines to trigger the network selection when (the start time of the backoff timer+the length/duration of the backoff timer)>end of the time validity period of the NPN. This is because UE 1201 is only authorized to access the NPN for a limited period of time, e.g., as specified by the time validity information. If the backoff timer is running during the limited period of time (e.g., at the end of the time validity period of the NPN), then the UE will not be authorized to access the NPN upon/after the backoff timer expiry. As a result, the UE will not be able to receive the localized service at all. In step 1241, UE 1201 selects and registers to another network (NPN (SNPN or PNI-NPN) or PLMN) for receiving services. Optionally, in step 1251, UE 1201 removes the first NPN from the UE-maintained SNPN/GIN/CAG list since it is not allowed to access the NPN to prevent the UE from selecting the same first NPN again in future network selection procedure.

FIG. 13 illustrates an example of different NPN configuration and associated validity information when providing localized services. In the example of 1310 in FIG. 13, an NPN-enabled UE 1301 is configured with information for each subscribed SNPN (e.g., SNPN 1) as depicted by 1310, or with a CAG related configuration 1320. If the UE supports access to an SNPN using credentials from a Credentials Holder, then the UE is also configured with a Credentials Holder controlled prioritized list of preferred SNPNs (e.g., SNPN 121, SNPN 122), and a Credentials Holder controlled prioritized list of GINs (e.g., GIN 131, GIN 132). SNPN 121 and GIN 131 are not associated with any validity information, while SNPN 122 and GIN 132 are associated with validity information, e.g., time duration restriction of January-$2^{nd}$ 20:00 pm to 22:00 pm, for providing localized services. Similarly, the CAG related configuration comprises a list of allowed CAG-IDs of PLMN 111, which includes CAG AAA, BBB, and CCC. CAG AAA is associated with validity information, e.g., time duration restriction of January-$2^{nd}$ 20:00 pm to 22:00 pm, for providing localized services.

If UE 1301 wants to register to SNPN 122/GIN 132/CAG AAA for localized services, but receives a DL NAS message with a backoff timer, then UE 1301 needs to decide whether it can still trigger the network selection for registration even though the backoff timer is running. In the example of FIG. 13, assume that the backoff timer has a timeout length/duration of two hours, and the UE time is January $2^{nd}$, 21:00 pm when receiving the NAS message with the backoff timer. The time validity restriction for SNPN 122 or GIN 132 or CAG AAA is 20:00 pm to 22:00 pm. Suppose the UE starts the backoff timer at the current time of 21:00 pm, then the backoff time will expire at 23:00 pm. However, based on the validity information, the UE is only allowed to access SNPN 122 or GIN 132 or CAG AAA from 20:00 pm to 22:00 pm. In another word, the time validity restriction of SNPN 122 or GIN 132 or CAG AAA is no longer satisfied upon/after the backoff timer expiry. As a result, UE 1301 can trigger the network selection, and register to another network to get services.

FIG. 14 is a flow chart of a method of backoff timer handling when an NPN is a hosting network for localized services in accordance with one novel aspect. In step 1401, a UE maintains a non-public network (NPN) configuration, wherein the NPN configuration comprises a number of configurations, comprises at least one of a list of standalone non-public networks (SNPNs), a list of Group IDs for Network Selection (GIN), and a list of closed access group identifiers (CAG IDs). In step 1402, the UE receives a downlink non-access stratum (NAS) message from an NPN providing access for localized services, wherein the NAS message comprises a back-off timer. In step 1403, the UE determines whether to trigger a network selection based on validity information associated with the NPN and a duration of the back-off timer. In step 1404, the UE selects (PLMN selection or SNPN selection) and registers to another network when validity criteria are met while the back-off timer is still running, wherein the validity criteria are not met upon or after the back-off timer expiry.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:

maintaining a non-public network (NPN) configuration by a user equipment (UE), wherein the NPN configuration comprises at least one of a list of standalone non-public networks (SNPNs), a list of Group IDs for Network Selection (GIN), and a list of closed access group identifiers (CAG IDs);

receiving a downlink non-access stratum (NAS) message from an NPN providing access for localized services, wherein the NAS message comprises a back-off timer;

determining whether to trigger a network selection based on validity information associated with the NPN and a duration of the back-off timer; and entering a PLMN-SEARCH state, selecting, and registering to another network when validity criteria based on the validity information are not met upon or after the back-off timer expiry.

2. The method of claim 1, wherein the NPN is an SNPN that broadcasts an SNPN ID that is included in the list of SNPNs.

3. The method of claim 1, wherein the NPN is an SNPN that broadcasts a GIN that is included in the list of GINs of the NPN configuration.

4. The method of claim 1, wherein the NPN is a CAG cell in a PLMN that broadcasts a CAG ID that is included in the list of CAG IDs.

5. The method of claim 1, wherein the network selection refers to a PLMN selection, an SNPN selection, a hosting network selection, a localized services network selection, or a PLMN selection for localized services.

6. The method of claim 1, wherein the downlink NAS message is a DL NAS transport message, a REGISTRA-TION REJECTION message, a DEREGISTRATION REQUEST message, a SERVICE REJECT message, or a DL 5GSM message.

7. The method of claim 1, wherein the back-off timer is a general purpose back-off timer, a T3346, a T3526, a T3584, a T3396, or a T3585.

8. The method of claim 1, wherein the validity information comprises time validity information, and wherein the UE is authorized to access the NPN only if a current UE time matches with the time validity information.

9. The method of claim 1, wherein the UE removes the NPN from the UE-maintained NPN configuration.

10. The method of claim 1, wherein a cause value #22 indicating a Congestion condition is included in the NAS message.

11. A User Equipment (UE), comprising:

a non-public network (NPN) configuration handling circuit that maintains an NPN configuration, wherein the NPN configuration comprises at least one of a list of standalone non-public networks (SNPNs), a list of Group IDs for Network Selection (GIN), and a list of closed access group identifiers (CAG IDs);

a receiver that receives a downlink non-access stratum (NAS) message from an NPN providing access for localized services, wherein the NAS message comprises a back-off timer;

a control circuit that determines whether to trigger a network selection based on validity information associated with the NPN and a duration of the back-off timer; and a network selection handling circuit that enters a PLMN-SEARCH state, selects, and registers to another network when validity criteria based on the validity information are not met upon or after the back-off timer expiry.

12. The method of claim 1, wherein the NPN is an SNPN that broadcasts an SNPN ID that is included in the list of SNPNs.

13. The UE of claim 11, wherein the NPN is an SNPN that broadcasts a GIN that is included in the list of GINs of the NPN configuration.

14. The UE of claim 11, wherein the NPN is a CAG cell in a PLMN that broadcasts a CAG ID that is included in the list of CAG IDs.

15. The UE of claim 11, wherein the network selection refers to a PLMN selection, an SNPN selection, a hosting network selection, a localized services network selection, or a PLMN selection for localized services.

16. The UE of claim 11, wherein the downlink NAS message is a DL NAS transport message, a REGISTRA-TION REJECTION message, a DEREGISTRATION REQUEST message, a SERVICE REJECT message, or a DL 5GSM message.

17. The UE of claim 11, wherein the back-off timer is a general purpose back-off timer, a T3346, a T3526, a T3584, a T3396, or a T3585.

18. The UE of claim 11, wherein the validity information comprises time validity information, and wherein the UE is authorized to access the NPN only if a current UE time matches with the time validity information.

19. The UE of claim 11, wherein the UE removes the NPN from the UE-maintained NPN configuration.

20. The UE of claim 11, wherein a cause value #22 indicating a Congestion condition is included in the NAS message.

* * * * *